United States Patent
Vinod et al.

(10) Patent No.: US 10,102,129 B2
(45) Date of Patent: Oct. 16, 2018

(54) MINIMIZING SNOOP TRAFFIC LOCALLY AND ACROSS CORES ON A CHIP MULTI-CORE FABRIC

(71) Applicant: Intel Corporation, Santa Clara, CA (US)

(72) Inventors: Krishna N. Vinod, San Jose, CA (US); Avinash Sodani, Portland, OR (US); Zainulabedin J. Aurangabadwala, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/976,678

(22) Filed: Dec. 21, 2015

(65) Prior Publication Data

US 2017/0177483 A1    Jun. 22, 2017

(51) Int. Cl.
*G06F 12/08* (2016.01)
*G06F 12/0815* (2016.01)
*G06F 12/0811* (2016.01)

(52) U.S. Cl.
CPC ...... *G06F 12/0815* (2013.01); *G06F 12/0811* (2013.01); *G06F 2212/621* (2013.01)

(58) Field of Classification Search
CPC ....... G06F 12/00; G06F 12/08; G06F 12/0811
USPC .......................... 711/100, 117, 118, 122, 154
See application file for complete search history.

(56) References Cited

U.S. PATENT DOCUMENTS

| | | | | |
|---|---|---|---|---|
| 5,369,753 A | * | 11/1994 | Tipley ............. | G06F 12/0811 |
| | | | | 711/122 |
| 5,642,494 A | * | 6/1997 | Wang ................ | G06F 12/0859 |
| | | | | 711/140 |
| 5,652,859 A | * | 7/1997 | Mulla ................ | G06F 12/0831 |
| | | | | 711/144 |
| 5,740,400 A | | 4/1998 | Bowles | |
| 5,897,656 A | * | 4/1999 | Vogt .................. | G06F 12/0833 |
| | | | | 711/141 |
| 6,073,212 A | | 6/2000 | Hayes et al. | |

(Continued)

FOREIGN PATENT DOCUMENTS

WO    WO2007002901    1/2007

OTHER PUBLICATIONS

International Search Report for PCT/US2016/062926 dated Mar. 13, 2017, 13 pages.

*Primary Examiner* — Tuan Thai
(74) *Attorney, Agent, or Firm* — Lowenstein Sandler LLP

(57) ABSTRACT

A processor includes a processing core, a L1 cache comprising a first processing core and a first L1 cache comprising a first L1 cache data entry of a plurality of L1 cache data entries to store data. The processor also includes an L2 cache comprising a first L2 cache data entry of a plurality of L2 cache data entries. The first L2 cache data entry corresponds to the first L1 cache data entry and each of the plurality of L2 cache data entries are associated with a corresponding presence bit (pbit) of a plurality of pbits. Each of the plurality of pbits indicates a status of a corresponding one of the plurality of L2 cache data entries. The processor also includes a cache controller, which in response to a first request among a plurality of requests to access the data at the first L1 cache data entry, determines that a copy of the data is stored in the first L2 cache data entry; and retrieves the copy of the data from the L2 cache data entry in view of the status of the pbit.

25 Claims, 16 Drawing Sheets

(56) References Cited

U.S. PATENT DOCUMENTS

| | | |
|---|---|---|
| 2004/0186964 A1 | 9/2004 | Dieffenderfer et al. |
| 2005/0144387 A1* | 6/2005 | Adl-Tabatabai .... G06F 12/0862 711/118 |
| 2008/0162661 A1* | 7/2008 | Mannava ........... G06F 12/0831 709/213 |
| 2010/0191916 A1* | 7/2010 | Balakrishnan ...... G06F 12/0808 711/134 |
| 2010/0235586 A1 | 9/2010 | Gonion |

* cited by examiner

MINIMIZING SNOOP TRAFFIC LOCALLY AND ACROSS CORES ON A CHIP MULTI-CORE FABRIC

TECHNICAL FIELD

The embodiments of the disclosure relate generally to cache management and, more specifically, to minimizing snoop traffic both locally and across cores on a chip multi-core fabric.

BACKGROUND

A processor may include one or more processing cores, caches, and cache controllers. The cache controllers are circuit logic used to manage caches for read and write operations directed to a main memory. Caches may include different types of caches including L1, L2, and L3 caches. An L1 cache is a cache dedicated to a specific processing core. An L2 cache is a cache shared by several cores in a multi-core processor. Further, multiple multi-core processors may share a common L3 cache. Each cache may include one or more cache entries to store local copies of data maintained in the main memory and the main memory addresses of the data. The cache controller of the processor may manage operations on L1, L2, and L3 caches according to a cache coherence protocol. The cache coherency protocol ensures consistency of data stored in multiple caches and the main memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
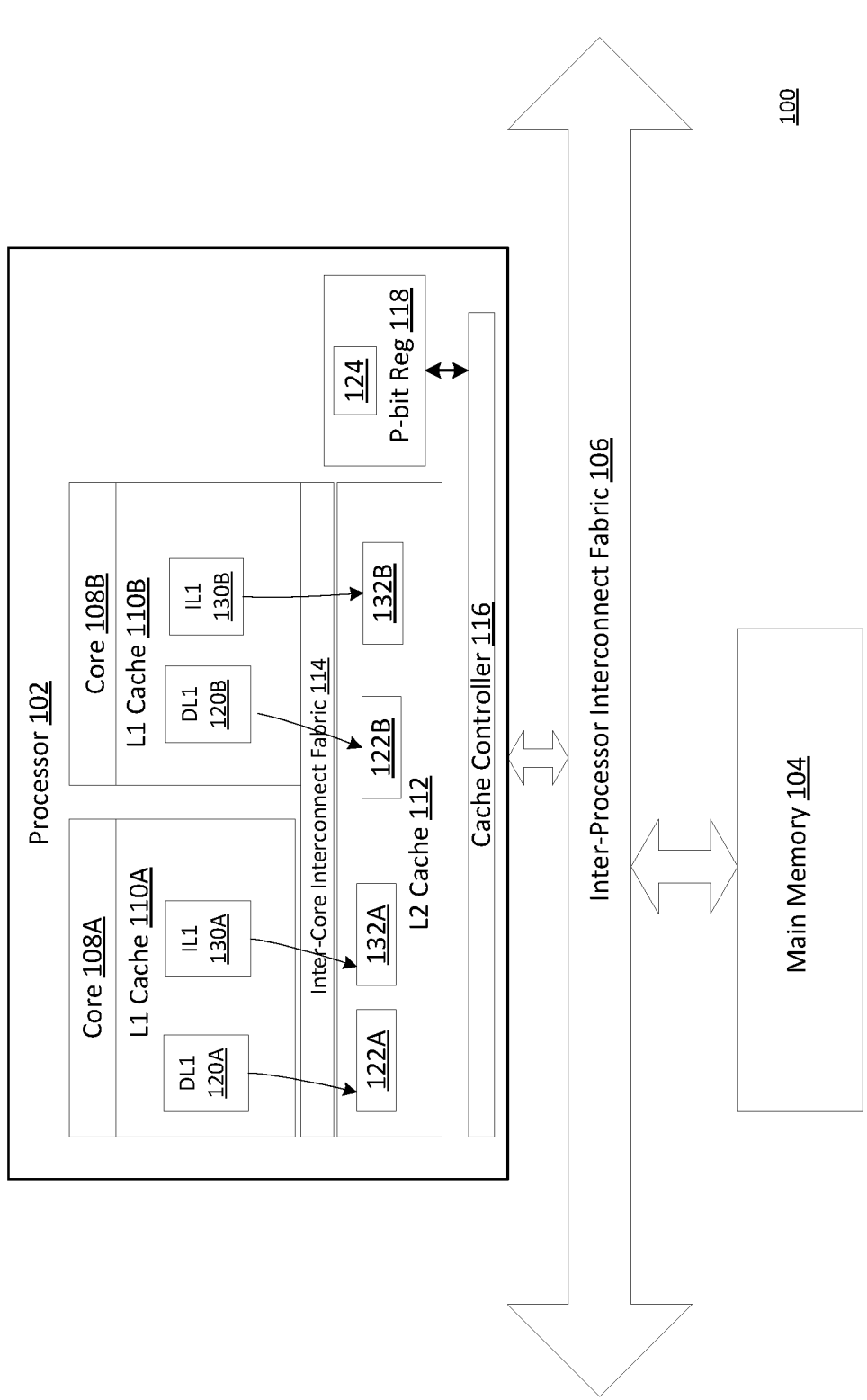
FIG. 1A illustrates a system-on-a-chip (SoC) including processing cores according to an embodiment of the present disclosure.

Aspects and implementations of the disclosure are directed to minimizing snoop traffic both locally and across cores on a chip multi-core fabric. The basic building block of an integrated core fabric (also referred to as a chip multi-core fabric) is a processor consisting of one or more processing cores, each of which includes one or more L1 caches and a common shared L2 cache. A cache is commonly used to increase the speed of memory read and write operations. When a processing core of a processor seeks to read a data item from a location in the main memory, the processing core may first check whether a copy of the data item is stored in the one of the L1 or L2 caches. If the processing core determines that the data item is indeed stored in one of the L1 or L2 caches (known as a "cache hit"), the processing core may read the data item from the L1 or L2 cache rather than from the main memory. If the processing core determines that a valid copy of the data item cannot be found in one of the L1 or L2 cache (known as a "cache miss"), the processing core may read the data item from the main memory.

A cache may include one or more cache entries to store data items to be read from or written to memory locations. Each cache entry may include a data field to store the data item and a tag field to store the location at which the data is stored in the main memory. The data item may have been stored in the cache due to execution of previous instructions. The contents stored in cache entries of the cache system may change while the processor continuously executes instructions in an instruction pipeline. One or more cache controllers may monitor the instruction executions directed to the main memory and the cache entries of the cache system to ensure that the data items stored in a cache are consistent with data items stored in other caches and the main memory according to a cache coherency protocol. A cache controller may invalidate a cache entry if the cache controller detects that the data item stored in the cache entry is inconsistent with copies of the data item stored in other caches and/or the main memory. A cache miss may occur if a processing core attempts to read a data item that is non-existent or is labeled as invalid in a cache entry of the cache system.

In the event that a cache miss occurs (e.g., the data item to be read by the processor is not in the cache or is invalid), the processing core may retrieve the data item from the main memory. Further, the processing core may store the previously un-cached data item (retrieved from the main memory) in the cache system as a local copy for use by future instructions executed by processor. In certain situations, the processing core may need to evict a data item stored in a cache entry to make room for the data item newly retrieved from the main memory.

In existing core fabrics, the L2 cache is either inclusive or not inclusive of the contents of the L1 cache. As such, when the L2 cache is inclusive of the contents of the L1 cache, a data item may be stored in both the L1 cache and L2 cache associated with a processing core. When the L2 cache is non-inclusive of the contents of the L1 cache, a data item stored in L1 cache is not necessarily stored in L2 cache associated with the processing core. In some cases, existing core fabrics may become loaded with coherency traffic generated by snoops to access data through inter-core interconnect fabric. The coherency traffic occurs when multiple snoops access data from the same cache. A snoop is a process where individual caches monitor address lines for accesses of the data that they have cached. As such, resources in the cores and fabric bandwidth are heavily consumed, which reduces overall efficiency of the processor and overall system. Further, when the data is to be retrieved from the main memory, requests are generated, inserted into a pipeline and placed in a queue to be processed. A conflict is generated when the requests are for the same memory address in the main memory. Such requests are rejected, which results in multiple retries of these requests to be inserted into the pipeline until the previous request for the same memory address has been processed. As such, there is a long period of request-reject-retry looping through the pipeline, which results in waste of pipeline access cycles and power.

Embodiments of the disclosure overcome the above problems by implementing a mechanism to minimize snoop traffic both locally and across cores on a chip multi-core fabric. In one embodiment, a block of presence bits (pbits) is implemented in a processor to be associated with a cache entry in an L2 cache corresponding to a cache entry in an L1 cache. The pbits provide for a status of the corresponding cache entry in the L1 cache. Thus, a snoop is injected into the core when the status of the cache entry, as indicated in the pbit, is present and valid in the L1 cache; otherwise, the snoop is not injected (i.e., when the status of the cache entry, as indicated in the pbit, is either not present or not valid in the L1 cache).

In one embodiment, a cache entry in the L2 cache is sent to a core requesting data from another core when the status of the cache entry in the L1 cache of another core is either not present or not valid. In this embodiment, an instruction is sent to the core to not use the cache entry in the L2 cache until the cache entry in the L1 cache of another core becomes present or valid.

In another embodiment, a state restriction is provided in the L2 cache such that when the cache entry is present in L1 cache, it is allowed to be in the L2 cache when certain states (e.g., "Modified," "Exclusive," "Shared,", "Invalid" or "Forwarding") are present. A snoop-generating request may first look up the L2 cache to check the state in order to determine whether the snoop is to be injected into the L1 cache. As such, the snoops injected into the cores are filtered, which results in less consumption of the resources in the cores and fabric bandwidth and increases overall efficiency of the system.

In a further embodiment, when a conflict occurs, requests are placed in a sleep mode. The requests are changed back into a wake mode and sent into the pipeline to be processed when the previous request for the same memory address has been processed. As such, there is a no need to retry the requests when they are rejected and, as such, there is no looping through the pipeline. This results in saving the time period and consumption of pipeline access cycles and powers.

FIG. 1A illustrates a system-on-a-chip (SoC) 100 including processing cores according to an embodiment of the present disclosure. The SoC 100 may include a processor 102, a main memory 104, and an inter-processor interconnect fabric 106, which Processor 102 may further include one or more processing cores 108A, 108B. Although, only one processor 102 is illustrated, one of ordinary skill in the art will appreciate that the SoC 100 may have more than one processor 102 according to the embodiment of the present disclosure.

Each of the processing cores 108A-108B may be associated with a dedicated L1 cache 110A-110B dedicated to the corresponding processing core. For example, as shown in FIG. 1A, the processing core 108A is associated with L1 cache 110A, and the processing core 108B is associated with L1 cache 110B. Further, processing cores 108A-108B may be associated with an L2 cache 112. The L2 cache 112 may communicate with L1 caches 110A, 110B and processing cores 108A, 108B via an inter-core interconnect fabric 114. The processor 102 further includes a main memory (e.g., double data rate (DDR) memory) 140.

In one embodiment, processor 102 may further include a cache controller 116 to manage cache entries in the L1 110A-110B and L2 112 caches according to a cache coherency protocol. Cache controller 116 may monitor the read/write operations issued by processing cores 108A, 108B and update the status of cache entries in L1 caches 110A, 110B and L2 cache 112.

The processor 102 has two ports for memory access, one for instructions and the other for data. Therefore, each of the L1 caches 110A-110B may be of two types: data cache entry DL1 120A-DL1 120B and instruction cache entry IL1 130A-IL130B. The major difference between the two types is that the data cache entry, DL1 is capable of performing both read and write operations, while instruction cache entry, IL1 provides only read operations.

In one embodiment, L2 cache 112 is an inclusive L2 cache such that data in the data cache entry DL1 120A, 120B stored in L1 caches 110A, 110B respectively is also stored in L2 cache 112. Thus, copy of data in the data cache entry DL1 120A, 120B is also stored in a L2 cache entry 122A, 122B of the L2 cache 112. In one embodiment, upon receipt of a snoop from another processor (not shown), the cache controller 116 would retrieve the data directly from the L2 data cache entry 122 stored in the L2 cache 112. Furthermore, the cache controller 116 does not communicate with the L1 caches 110A, 110B, thus minimizing internal traffic in the cores 108A-108B, details of which are provided below.

In one embodiment, processor 102 may further include a block of presence bits (pbits) 124 each of which may be associated with L2 cache entries 122A, 122B of the L2 cache 112. Each pbit 124 indicates whether a DL1 cache entry 120A, 120B corresponding to the pbits' associated entry L2 cache entries 122A-122B in the L2 cache 112 is either present in the respective L1 cache 110A, 110B and, if present, whether the DL1 cache entry 120A, 120B is valid. In one embodiment, the DL1 cache entry 120A stores a pointer to L2 cache entry 122A to determine where to set the bit in the L2 cache entry 122A. As such, address of L2 cache entry 122A is stored in DL1 cache entry 120A. In one embodiment, the DL2 cache entry 120B stores a pointer to L2 cache entry 122B to determine where to set the bit in the L2 cache entry 122B. As such, address of L2 cache entry 122B is stored in DL1 cache entry 120B. Each of the L2 cache entries 122A, 122B corresponds to a pbit 124. In one embodiment, each of the L2 cache entries 122A, 122B include the pbit 124. On embodiment, every L2 cache entry 122A has a pbit 124 and every cache entry 122B has a pbit 124. For every cache line in L2 cache 112 there is a corresponding pbit 124. When the pbit 124 associated with the L2 cache entries 122A, 122B is set (e.g., value=1), it indicates that the DL1 cache entry 120A, 120B is present and valid. In one embodiment, the DL1 cache entry 120A, 120B is valid when the DL1 cache entry 120A, 120B is currently being used (i.e. there is a modification in the DL1 cache entry 120A, 120B). When the pbit associated with the L2 cache entries 122A, 122B is cleared (e.g., value=0), it indicates that the data in the DL1 cache entry 120A, 120B is either not present in the L1 cache 110A, 110B or, if the DL1 cache entry 120A, 120B is present, it is not valid. In one embodiment, the DL1 cache entry 120A, 120B is invalid when the DL1 cache entry 120A, 120B is currently not being used (i.e. there is no modification in the DL1 cache entry 120A, 120B).

In one embodiment, upon receipt of a snoop from another processor (not shown) for the data, the cache controller 116 would examine the pbit 124 associated with the L2 cache entries 122A, 122 B. In one embodiment, when the pbit 124 is set, the cache controller 116 determines that the data may be in the L2 cache entries 122A, 122B of the L2 cache 112 but this data is not currently updated data (i.e. modified data) and the this updated data is in the L1 cache entries 120A, 120B of the L1 Cache 110A and 110B. The L2 cache 112 retrieves the updated data from the DL1 120A in L1 cache 110A and DL1 120B in L1 Cache 110B. In such case, the L2 cache 112 will enter the inter-core interconnect fabric 114 to retrieve the updated data from the core 108A-108B. The L2 cache 112 stores the retrieved updated data from the DL1 120A and DL1 120B in the 122A and the 122B respectively of the L2 cache 112. In one embodiment, when the pbit 124 is not set, i.e. cleared, the cache controller 116 determines that the updated data is in the L2 cache entries and retrieves the updated data directly from the L2 cache entries 122A, 122B in the L2 cache 112. As such, the traffic into the core 108A-108B is removed when the pbit 124 is set.

In one embodiment, the block of pbits 124 is stored in a p-bit register 118 operatively coupled to the cache controller 116. In another embodiment, the block of pbits 124 is part of the L2 cache 112. In yet another embodiment, each of the L2 cache entries 122A, 122B include a pbit 124.

A modified exclusive shared invalid forwarding (MESIF) protocol is a type of cache coherence protocol. Under the MESI protocol, the cache controller 116 may mark a cache entry with one of "Modified," "Exclusive," "Shared,", "Invalid" or "Forwarding" state. The Modified (M) state indicates that the cache controller 116 determines that the copy stored in the entry has been modified from the data stored in the main memory 104. The cache is should write the data back to main memory 104 at some time in the future before permitting any other read of the (no longer valid) main memory state. The write-back from the cache to the main memory 104 causes the cache controller 116 to change the state of the cache entry to the Exclusive (E) state.

The Exclusive (E) state indicates that the cache controller 116 determines that the cache entry matches the data stored in the main memory 104 and is not shared by other caches. The cache controller 116 may change the state of the cache entry to the Shared state in response to a read request to the main memory 104 originated from another processing core or another processor. Alternatively, the cache controller 116 may change the state of the cache entry to the Modified state when the content of the cache entry is written over.

The Shared (S) state indicates that the cache controller 116 determines that the cache entry is also stored in another cache (e.g., after being read by another processing core or another processor). The Invalid (I) state indicates that the cache controller 116 determines that the cache entry is invalid (or unused). The forwarding (F) state indicates that the cache controller 116 determines that the one cache entry flagged with the "Forward" state is responsible for forwarding the data to a requester of the data.

In one embodiment, the L2 cache 112 is a non-inclusive L2 cache. When the L2 cache 112 is a non-inclusive cache, such that when the L2 cache is in one of S or F state, the instruction maybe in cache entry IL1 130A, IL 130B but an invalidating message is sent to the L1 caches 110A and 110B to remove the instruction from the cache entry IL1 130A, IL 130B when the cores 108A and 108B requesting to modify the instruction later on. Accordingly, the instruction is retrieved directly from L2 cache 112. In one embodiment, the L2 cache 112 is a non-inclusive cache, such that when the L2 cache is in one of E or M state, the instruction cache entry IL1 130A, IL1130B is present in the L2 cache 112 and not necessarily in the L1 130A, IL1 130B of the L1. Accordingly, no message is sent to L1 cache 110A, 110B and the instruction is retrieved directly from L2 cache 112.

As discussed above, the instruction cache entries IL1 130A, IL1 130B are read only operations (i.e., cannot modify data). Because the instruction cache entries IL1 130A, IL1 130B cannot modify data, there is no need for direct communications from the instruction IL1 130A, IL1 130 B to the inter-processor interconnect fabric 106 for evicting the instructions in the instruction cache entries IL1 130A, IL130B after the instructions are executed.

In one embodiment, upon receipt of a snoop from another processor (not shown) for the instruction, the cache controller 116 would look at the cache entry state of the L2 Cache 112. When the cache entry state is one of the S or the F state instruction maybe in cache entry IL1 130A, IL 130B but an invalidating message is sent to the L1 caches 110A and 110B to remove the instruction from the cache entry IL1 130A, IL 130B when the cores 108A and 108B requesting to modify the instruction later on. Accordingly, the instruction is retrieved directly from L2 cache 112. When the cache entry state of the L2 cache 112 is one of E or the M state, the instruction cache entry IL1 130A, IL1130B is present in the L2 cache 112 and not necessarily in the L1 130A, IL1 130B of the L1. Accordingly, no message is sent to L1 cache 110A, 110B and the instruction is retrieved directly from the L2 cache 112. As such, the snoops into the core are filtered, which results in minimizing traffic into the core 108A-108B.

Figure 1B:
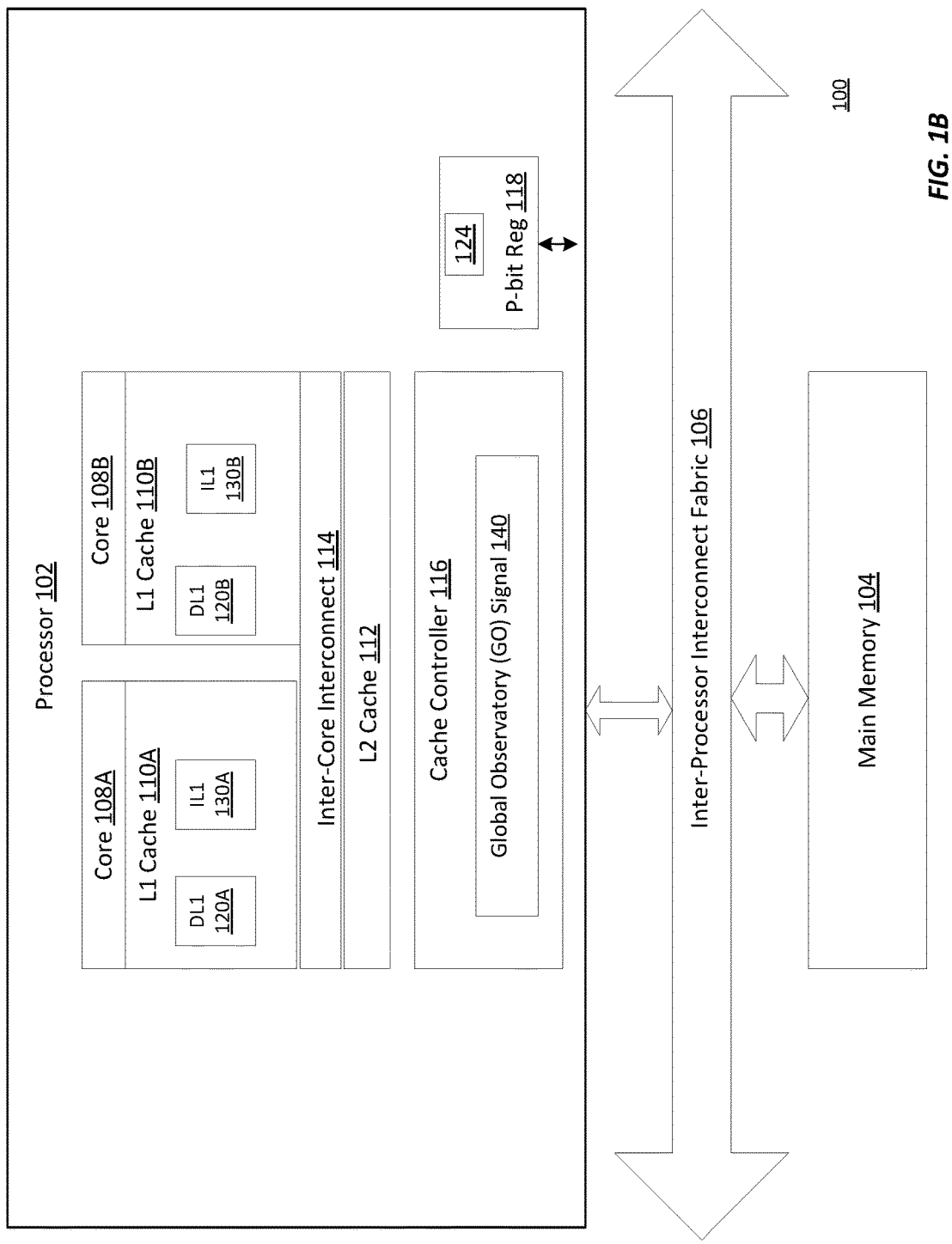
FIG. 1B illustrates an SoC including processing cores according to an embodiment of the present disclosure.

FIG. 1B illustrates an SoC 100 including processing cores according to an embodiment of the present disclosure. The SoC 100 may include a processor 102, a main memory 104, and an inter-processor interconnect fabric 106. Processor 102 may further include one or more processing cores 108A, 108B. Each of the processing cores 108A-108B may be associated with a dedicated L1 cache 110A-110B dedicated to the corresponding processing core. For example, as shown in FIG. 1B, the processing core 108A is associated with L1 cache 110A, and the processing core 108B is associated with L1 cache 110B. Further, processing cores 108A-108B may be associated with an L2 cache 112. The L2 cache 112 may communicate with L1 caches 110A, 110B and processing cores 108A, 108B via an inter-core interconnect fabric 114. The processor 102 further includes a main memory (e.g., DDR memory) 140.

In one embodiment, processor 102 may further include a cache controller 116 to manage cache entries in L1 and L2 caches according to certain cache coherency protocol. Cache controller 116 may monitor the read/write operations issued by processing cores 108A, 108B and update the status of cache entries in L1 caches 110A, 110B and L2 cache 112.

In one embodiment, processor 102 may further include a block of pbits 124 each of which may be associated with L2 cache entries 122A, 122B of the L2 cache 112. Each pbit 124 indicates whether a DL1 cache entry 120A, 120B corresponding to the pbits' associated entry 122A, 122B in the L2 cache 112 is either present in the respective L1 cache 110A, 110B and, if present, whether the DL1 cache entry 120A, 120B is valid. As discussed above, the DL1 cache entry 120A, 120B is valid when the DL1 cache entry 120A, 120B is currently being used (i.e. there is modification in the DL1 cache entry 120A, 120B). When the pbit 124 associated with the L2 cache entries 122A, 122B is set (e.g., value=1), it indicates that the DL1 cache entry 120A, 120B is present and valid. When the pbit associated with the L2 cache entries 122A, 122B is cleared (e.g. value=0), it indicates that the data in the DL1 cache entry 120A, 120B is not present in the L1 cache 110A, 110B or if present the DL1 cache entry 120A, 120B it is not valid, i.e. invalid. As discussed above, the DL1 cache entry 120A, 120B is invalid when the DL1 cache entry 120A, 120B is currently not being used (i.e. there is no modification in the DL1 cache entry 120A, 120B).

In one embodiment, the cache controller 118 includes a global observatory signal (GO) signal 140, which functions as a handshake between the DL1 120A, DL1 120B and the L2 cache 112. The GO signal 140 sends instructions to the core 108A and 108B whether to use the data entry being sent to the DL1 120A and DL1 120B.

In one embodiment, multiple requests for data are received by the L2 cache 112 from the cores 108A, 108B. In one example, the DL1 120A of the L1 cache 110A requests data from DL1 120B of the L1 cache 110B. In one embodiment, the cache controller 116 determines that the pbit 124 associated with the L2 cache entry 132A is set. As discussed above, when the pbit 124 is set, which indicates that the data in the DL1 120B of the L1 cache 110B is present and valid, In one embodiment, the cache controller 116 sends the L2 cache entry 132A to the core 108A along with the GO signal 140, which includes instructions that indicate to hold the L2 cache entry 132A but to not use it until further instructions. The L2 cache 112 may later snoop the L1 cache 110B of the core 108B to determine whether the DL1 120B is modified or not. In one embodiment, the L2 cache 112 may snoop the DL1 120B to determine whether the data has been modified or not. The Core 108B may send a signal to the L2 cache 112 indicating whether the data in DL1 120B has been modified or not. In one embodiment, the L2 cache 112 determines that the data in the DL1 120B has not been modified. The cache controller may send the GO signal 140 to Core 108A with instructions to use the L2 cache entry 132A previously sent. In one embodiment, the L2 cache entry 132A in DL1 120A is not used until the GO signal 140 from the Cache controller 116.

In one embodiment, the cache controller 116 determines that the pbit 124 associated with the L2 cache entry 132A is not set, i.e. clear. As discussed above, when the pbit 124 is clear, it indicates that the data in the DL1 20B of the L1 cache 110B is either not present or, if present, is invalid. In one embodiment, the cache controller 116 may retrieve the data directly from the L2 cache entry 132A. In one embodiment, the cache controller 116 sends the GO signal 140 to the DL1 prior to sending the L2 cache entry 132A. The GO signal includes 140 instructions indicating that the L2 cache entry 132A may be used by the core 108A. Subsequently, the L2 cache entry 132A is sent to as data for the DL1 120A

Figure 1C:
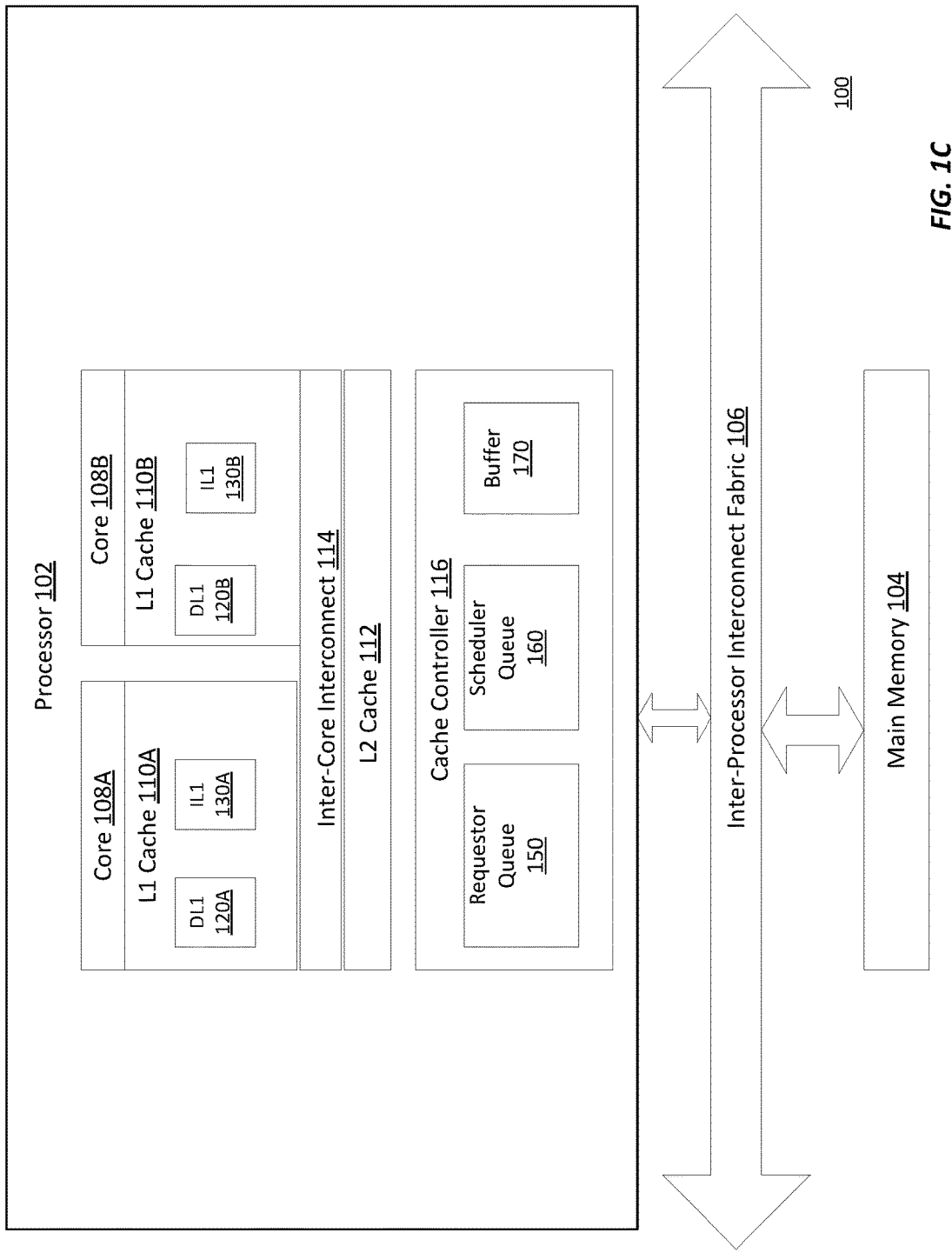
FIG. 1C illustrates an SoC including processing cores according to an embodiment of the present disclosure.

FIG. 1C illustrates an SoC 100 including processing cores according to an embodiment of the disclosure. The SoC 100 may include a processor 102, a main memory 104, and an inter-processor interconnect fabric 106. Processor 102 may further include one or more processing cores 108A, 108B. Each of the processing cores 108A-108B may be associated with a dedicated L1 cache 110A-110B dedicated to the corresponding processing core. For example, as shown in FIG. 1C, the processing core 108A is associated with L1 cache 110A, and the processing core 108B is associated with L1 cache 110B. Further, processing cores 108A-108B may be associated with an L2 cache 112. The L2 cache 112 may communicate with L1 caches 110A, 110B and processing cores 108A, 108B via an inter-core interconnect fabric 114. The processor 102 further includes a main memory (DDR memory) 140.

In one embodiment, processor 102 may further include a cache controller 116 to manage cache entries in L1 and L2 caches according to certain cache coherency protocol. Cache controller 116 may monitor the read/write operations issued by processing cores 108A, 108B and update the status of cache entries in L1 caches 110A, 110B and L2 cache 112.

In one embodiment, multiple requests to snoop (access) cache data entries are received by the L2 cache 112. Each of the snoop requests include at least one entry identifier (ID) used to identify memory address from which to retrieve the data corresponding to the request. In one embodiment, a first request among the plurality of requests is sent by the cores 108A, 108B to the L2 cache 112. When the L2 cache 112 is not able to fulfill the first request, the first request is sent to a requestor queue 150 of the cache controller 116. The requestor queue 150 transmits the first request in a scheduler queue 160 of the cache controller 116 to retrieve the data from main memory 104. In one embodiment, the requestor queue 150 stores the entry ID of the first request in a buffer 170. In one embodiment, the scheduler queue 160 keeps track of the requests being processed to determine which requests were completed, which requests were accepted to be completed and which requests were not completed.

In one embodiment, a second request among the plurality of requests is sent by the cores 108A, 108B to the L2 cache 112. When the L2 cache 112 is not able to fulfill the second request, the second request is sent to the requestor queue 150. In one embodiment, the requestor queue 150 compares the entry ID of the second request with the stored entry ID of the first request. In one embodiment, the requestor queue 150 detects a conflict when the entry ID for the second request matches with the stored entry ID of the first request. The conflict is detected because both the first and the second request correspond to retrieving data from the same memory address in the main memory 104. In one embodiment, when the conflict is detected, the requestor queue 150 places the second request in a sleep mode. The requestor queue may store the entry ID of the second request in the buffer 170 while the second request is in the sleep mode.

In one embodiment, when the first request is completed, the memory allocated in the main memory 104 is now de-allocated. The scheduler queue 160 then sends a de-allocated entry ID (a label or identification assigned by the scheduler queue 160 indicating that the first request is completed) of the first request to the requestor queue 150. In one embodiment, the de-allocated entry ID corresponds to de-allocation of the memory in the main memory. As such, the first request is completed and memory is now deallocated. In one embodiment, the requestor queue 150 updates the second request from the sleep mode to a wake mode upon receipt of the de-allocated entry ID of the first request. This is because as mentioned above, the de-allocated entry ID is a label or identification, which indicates that the first request is completed. In one embodiment, the requestor queue 150 transmits the second request to the scheduler queue 160 to retrieve data from the main memory 104. In one embodiment, the requestor queue 150 places multiple requests in sleep mode and stores the corresponding entry IDs in the buffer 170 when the conflict is detected. In one embodiment, the requestor queue 150 changes a request in sleep mode, among the plurality of requests in sleep mode, whose entry ID matches with the de-allocated entry ID received from the scheduler queue 160.

Figure 2A:
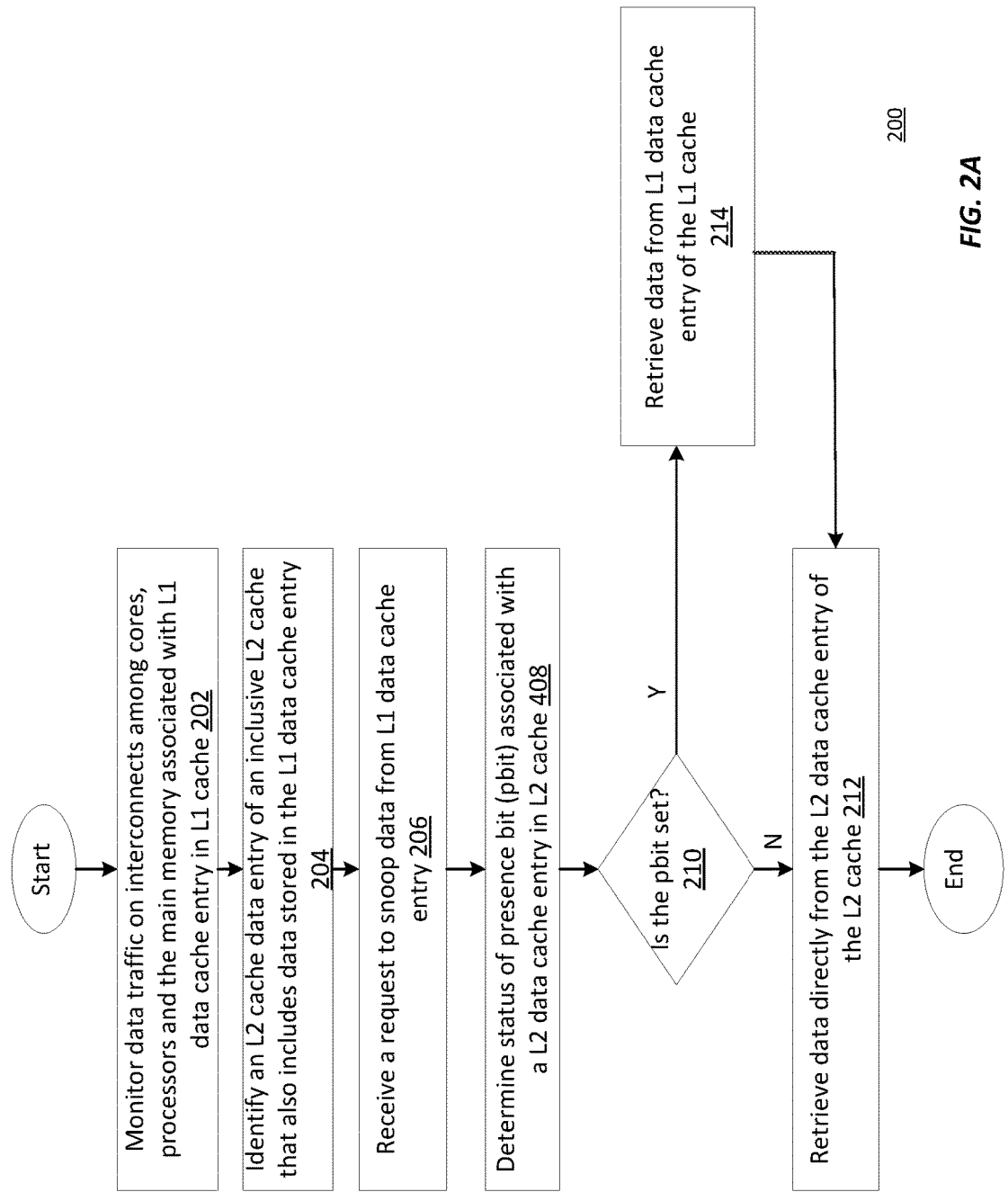
FIG. 2A is a block diagram of a method to minimize snoop traffic both locally and across cores on a chip multi-core fabric according to an embodiment of the present disclosure.

FIG. 2A is a block diagram of a method 200 to minimize snoop traffic both locally and across cores on a chip multi-core fabric according to an embodiment of the present disclosure. Method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the processor 102 including processing core 108 and cache controller 116 as shown in FIG. 1A.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 200 could alternatively be represented as a series of interrelated states via a state diagram or events.

Method 200 begins at block 202 where the cache controller of a processor may monitor data traffic on interconnects among processing cores, processors, and the main memory associated with an L1 data cache entry in L1 cache. At block 204, the cache controller may further identify an L2 data cache entry of an inclusive L2 cache that also includes the data stored in the L1 data cache entry. As the L2 cache is inclusive when each L1 data cache entry has a corresponding L2 data cache entry to store a copy of the data stored in the L1 data cache entry. At block 206, the cache controller may receive a request to snoop (access) data from L1 data cache entry.

At block 208, the cache controller may further determine a status of pbits associated with the L2 data cache entry in the L2 cache. At block 210, it is determined whether the pbit is set. In one embodiment, when the pbit associated with the L2 cache is set, this indicates that the L1 data cache entry is present and valid. In one embodiment, L1 data cache entry is valid when the L1 data cache entry is not actively being used (i.e. there is no modification in the L1 data cache entry). In one embodiment, when the pbit associated with the L2 cache is cleared, it indicates that the L1 data cache entry is either not present in the L1 cache or, if present, it is not valid.

When, at block 210, it is determined that the pbit is not set (i.e. cleared), then, at block 212 data from the L1 data cache entry is retrieved directly from the L2 cache because L2 cache is inclusive of the L1 data cache entry. In one embodiment, this data retrieved directly from the L2 cache is an updated data since the L2 cache includes the updated data when the pbit is not set. As discussed above, the L2 cache entry of an inclusive L2 cache also includes the data item stored in the L1 data cache entry. When, at block 210, it is determined that the pbit is set, then at block 214, the data is retrieved from the L1 data cache entry of the L1 cache. In one embodiment, this data retrieved from the L1 cache is an updated data since the L2 cache does not include the updated data when then the pbit is set.

Figure 2B:
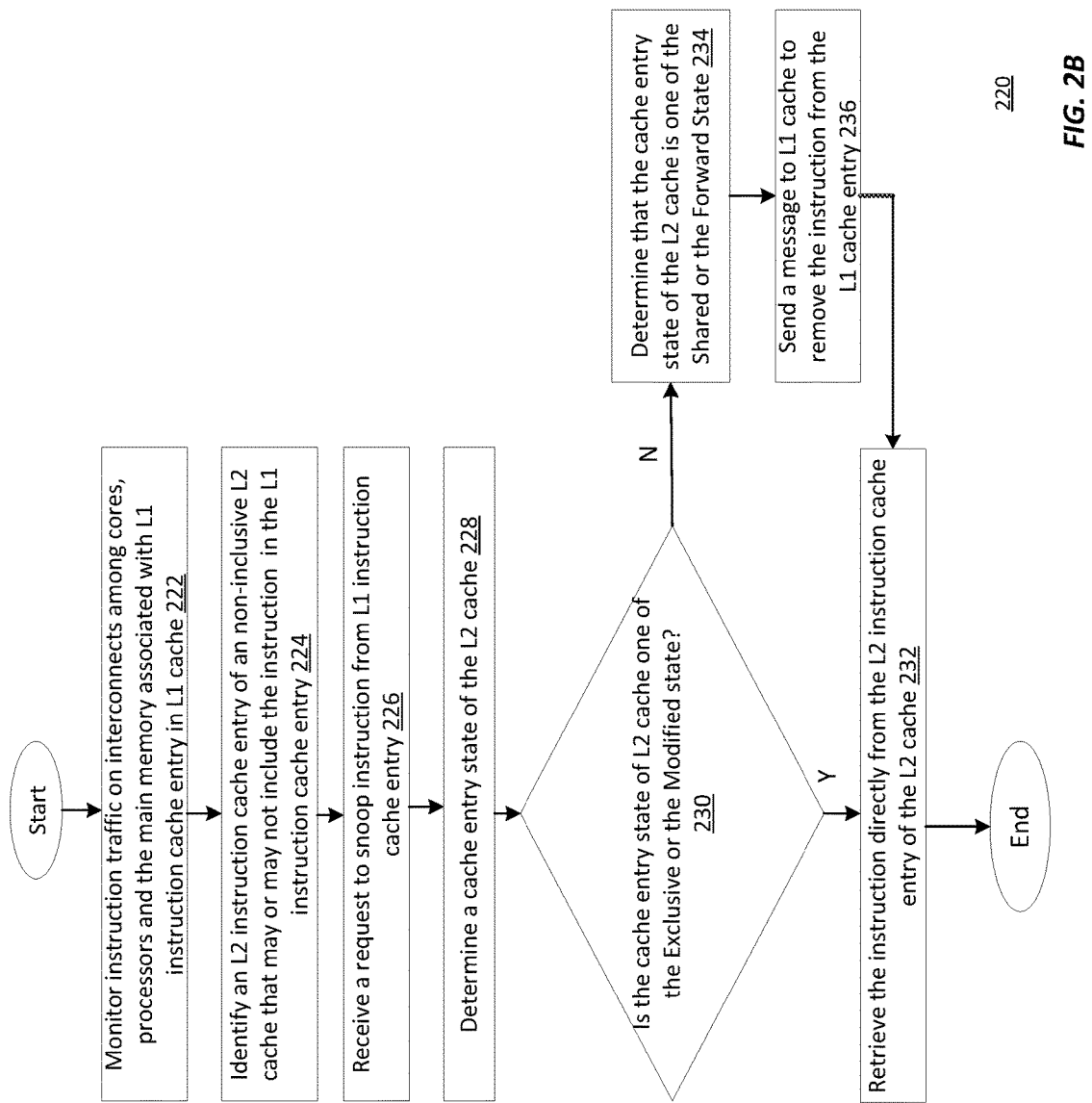
FIG. 2B is a block diagram of a method to minimize snoop traffic both locally and across cores on a chip multi-core fabric according to an embodiment of the present disclosure.

FIG. 2B is a block diagram of a method 220 to minimize snoop traffic both locally and across cores on a chip multi-core fabric according to an embodiment of the present disclosure. Method 220 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 220 may be performed, in part, by processing logic of the processor 102 including processing core 108 and cache controller 116 as shown in FIG. 1A.

For simplicity of explanation, the method 220 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 220 could alternatively be represented as a series of interrelated states via a state diagram or events.

Method 220 begins at block 222 where the cache controller of a processor may monitor instruction traffic on interconnects among processing cores, processors, and the main memory associated with an L1 instruction cache entry in L1 cache. At block 224, the cache controller may further identify an L2 instruction cache entry of a non-inclusive L2 cache that may or may not include the instruction in the L1 instruction cache entry.

In one embodiment, a when a cache entry state of the L2 cache is in an E or an M state, the instruction cache entry IL1 130A, IL1 130B is present in the L2 cache 112 and not necessarily in the L1 130A, IL1 130B of the L1. Accordingly, no message is sent to L1 cache 110A, 110B and the instruction is retrieved directly from L2 cache 112. As discussed above, the E state indicates that the cache controller determines that the cache entry matches the data stored in the main memory and is not shared by other caches. Also, as discussed above, the M state indicates that the cache controller determines that the copy stored in the entry has been modified from the data stored in the main memory.

In one embodiment, when the L2 cache is in one of S or F state, the instruction maybe in cache entry IL1 130A, IL 130B but an invalidating message is sent to the L1 caches 110A and 110B to remove the instruction from the cache entry IL1 130A, IL 130B when the cores 108A and 108B requesting to modify the instruction later on. Accordingly, the instruction is retrieved directly from L2 cache 112. As discussed above, the S state indicates that the cache controller determines that the cache entry is also stored in another cache (e.g., after being read by another processing core or another processor). Also, as discussed above, the F state indicates that the cache controller determines that a cache entry flagged with a "Forward" state is responsible for forwarding the data to a requester of the data.

At block 226, the cache controller may receive a request from a processor to snoop an instruction. At 228, the cache controller determines the cache entry state of the L2 cache.

At block 230, a decision is made as to whether the cache entry state of the L2 cache is one of the E or the M state. When, at block 230, it is determined that the cache entry state of the L2 cache is in one of the E or the M state, then, at block 232, a the instruction is retrieved directly from the L2 instruction cache entry of the L2 cache. When, at block 230, it is determined that the cache entry state of the L2 cache is not one of the E or the M state, then, at block 234, it is determined that the cache entry state of the L2 cache is in one of the S or the F state. At block 236, a message is sent to the L1 cache to remove the instruction. As discussed above this message is sent when cores request to modify the instruction later on. Block 232 is repeated such that the instruction is retrieved directly from the L2 instruction cache entry of the L2 cache.

Figure 3:
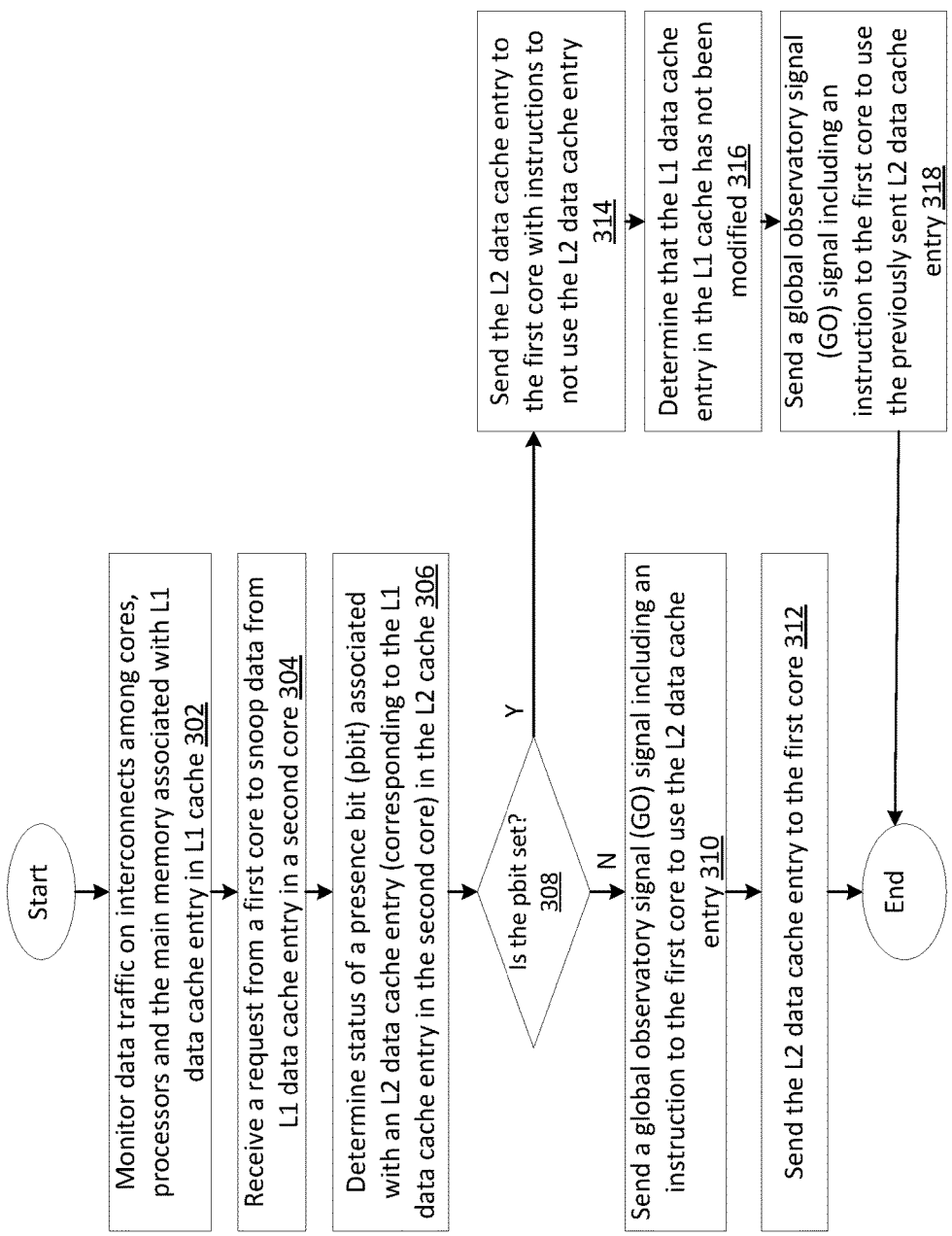
FIG. 3 is a block diagram of a method to minimize snoop traffic both locally and across cores on a chip multi-core fabric according to an embodiment of the present disclosure.

FIG. 3 is a block diagram of a method 300 to minimize snoop traffic both locally and across cores on a chip multi-core fabric according to an embodiment of the present disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the processor 102 including processing core 108 and cache controller 116 as shown in FIG. 1B.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 300 could alternatively be represented as a series of interrelated states via a state diagram or events.

Method 300 begins at block 302 where the cache controller of a processor may monitor data traffic on interconnects among processing cores, processors, and the main memory associated with an L1 data cache entry in L1 cache. At block 304, the cache controller may receive a request from a first core to snoop (access) data from an L1 data cache entry of a second core. At block 306, a status of a pbit associated with an L2 data cache entry (corresponding to the L1 data cache entry in the second core in an L2 cache is determined. As discussed above, the pbit indicates whether the L1 data cache entry of the second core corresponding to the L2 data cache entry is present or not in the L1 cache and if present whether it is valid or not. At block 308, it is determined whether the pbit is set. As discussed above, when the pbit associated with the L2 data cache entry is set, it indicates that the L1 data cache entry in L1 cache associated with the L2 data cache entry is present and valid. When, at block 308, the pbit is not set (i.e. clear), then, at block 310, the cache controller sends a GO signal including an instruction to the first core to use the L2 data cache entry. Subsequently, at block 312, the cache controller sends the L2 data cache entry to the first core.

Referring back to block 308, when it is determined that the pbit is set, the cache controller at block 314 sends the L2 data cache entry along with an instruction to the first core to hold the L2 data cache entry but to not use it. As discussed above, when the pbit is clear, it indicates that the L1 data cache entry associated with the L2 data cache entry is either not present in the L1 cache or, if present, is not valid (i.e. it is currently being used by the second core). At block 316, the cache controller determines that the L1 data cache entry has not been modified. The L2 cache may snoop the L1 cache data entry of the second core in order to determine whether the L2 data cache entry in the L1 cache data entry is modified. In one embodiment, the second core sends a signal that the L2 cache entry in the L1 cache data entry has not been modified. At block 318, the cache controller sends the GO signal including the instruction to the first core to use the previously sent L2 cache data entry.

Figure 4:
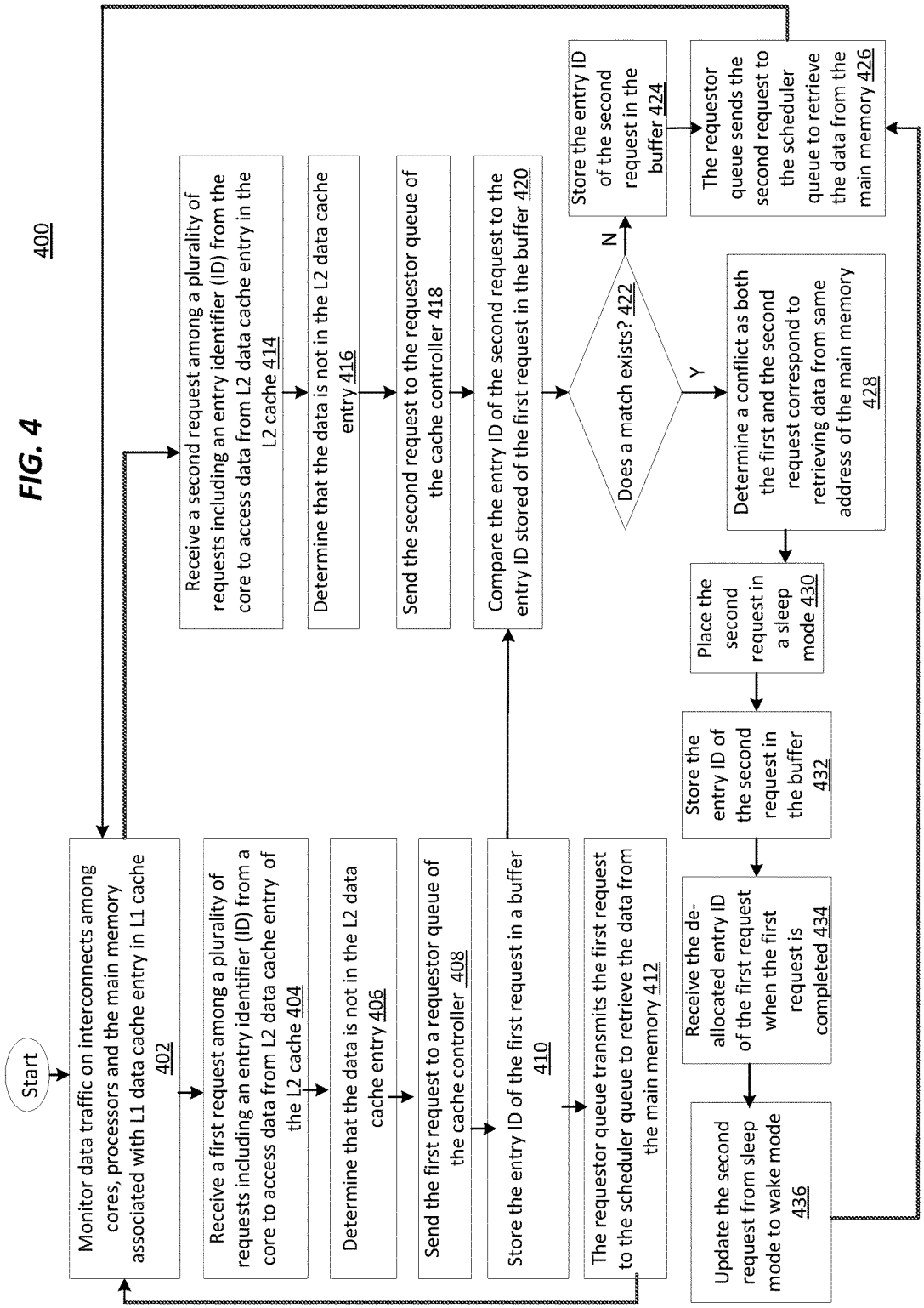
FIG. 4 is a block diagram of a method to minimize snoop traffic both locally and across cores on a chip multi-core fabric according to an embodiment of the present disclosure.

FIG. 4 is a block diagram of a method 400 to minimize snoop traffic both locally and across cores on a chip multi-core fabric according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the processor 102 including processing core 108, a cache controller 116 including a requestor queue 150 and a scheduler queue 160 as shown in FIG. 1C.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Method 400 begins at block 402 where the cache controller of a processor may monitor data traffic on interconnects among processing cores, processors, and the main memory associated with an L1 data cache entry in L1 cache. At block 404, the cache controller receives from at least one core a first request among a plurality of requests to access data in an L2 data cache entry. The first request includes an entry ID that identifies memory address from which to retrieve the data corresponding to the first request. At block 406, the cache controller determines that the data is not present in the L2 data cache entry of the L2 cache. At block 408, the cache controller sends the first request to a requestor queue of the cache controller. At block 410, the requestor queue stores the entry ID of the first request in the buffer. At block 412, the requestor queue transmits the first request to a scheduler queue of the cache controller to retrieve the data from the main memory.

At block 414, the cache controller receives from the core a second request among the plurality of requests to snoop (access) data from the L2 data cache entry. At block 416, the cache controller determines that the data is not present in the L2 data cache entry of the L2 cache. At block 418, the cache controller sends the second request to the requestor queue of the cache controller. At block 420, the requestor queue compares the entry ID of the second request with the stored entry ID of the first request. At block 422, it is determined whether a match exists. When at block 422, there is no match, then at block 424, the requestor stores the entry ID of the second request in the buffer. At block 426, the requestor queue transmits the second request to the scheduler queue of the cache controller to retrieve the data from the main memory.

When at block 422, it is determined that the match does exist, then, at block 428, the requestor queue considers this a conflict as both of the requests correspond to retrieving data from the same memory address in the main memory. At block 430, the requestor queue places the second request in a sleep mode. At block 432, the requestor queue stores the entry ID of the second request in the buffer. At block 434, the requestor queue receives a de-allocated entry ID (a label or identification assigned by the scheduler queue 160 indicating that the first request is completed) of the first request from the scheduler queue when the first request is completed. In one embodiment, the de-allocated entry ID corresponds to a de-allocation of the memory address in the main memory. At block 436, the requestor queue updates the second request from the sleep mode to a wake mode, which is followed by block 426.

Figure 5A:
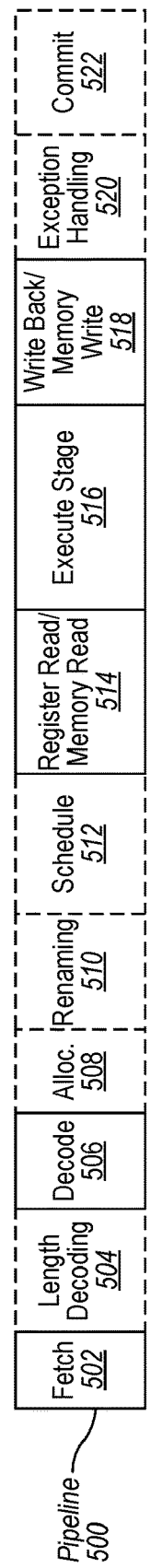
FIG. 5A is a block diagram illustrating a micro-architecture for a processor including heterogeneous core in which one embodiment of the disclosure may be used.

FIG. 5A is a block diagram illustrating an in-order pipeline and a register renaming stage, out-of-order issue/execution pipeline implemented by processing device 500 according to some embodiments of the disclosure. The solid lined boxes in FIG. 5A illustrate an in-order pipeline, while the dashed lined boxes illustrates a register renaming, out-of-order issue/execution pipeline. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5A.

Figure 5B:
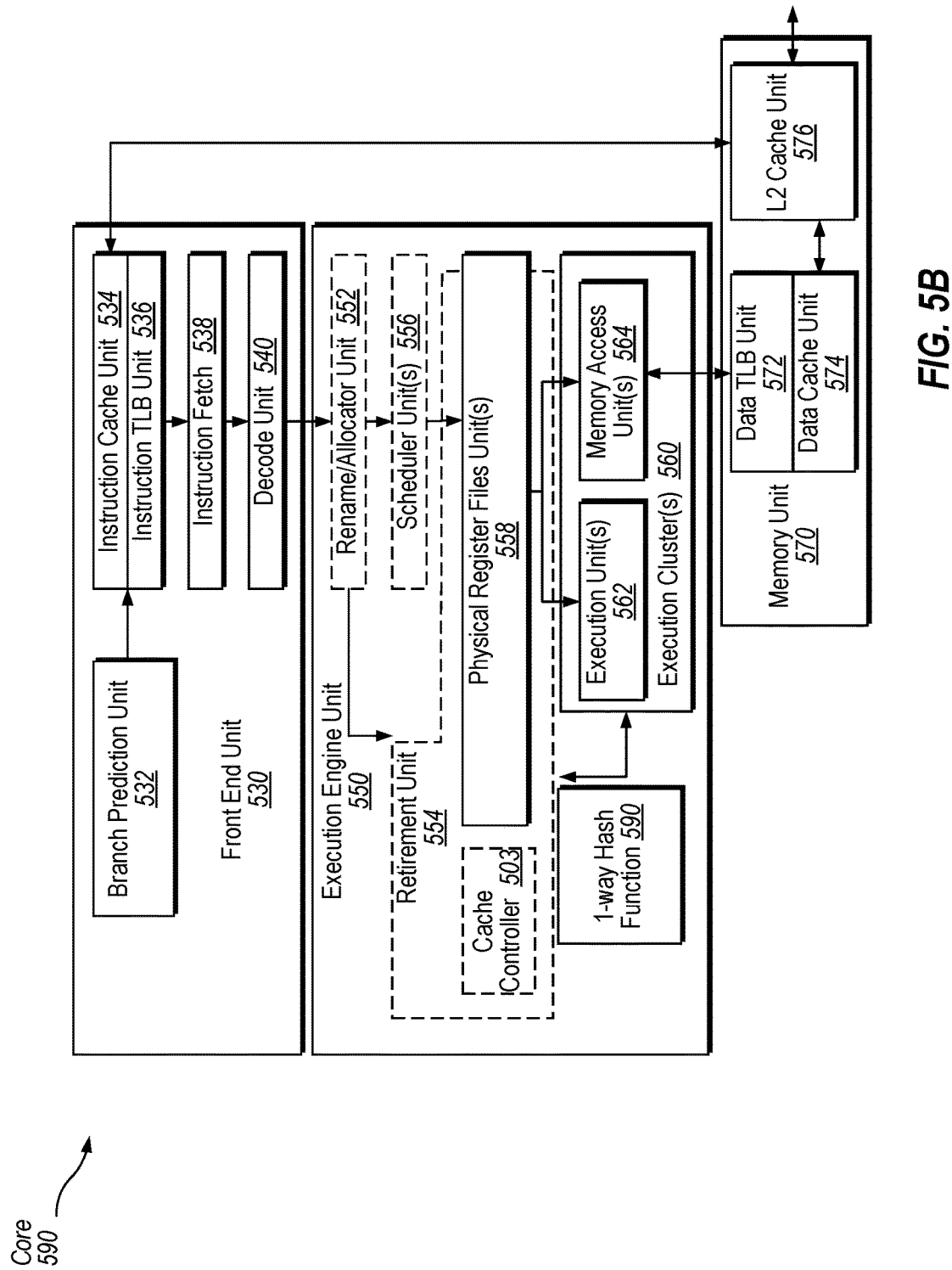
FIG. 5B is a block diagram illustrating an in-order pipeline and a register renaming stage, out-of-order issue/execution pipeline implemented according to at least one embodiment of the disclosure.

FIG. 5B is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The retirement unit 554 may include a cache controller 503 minimize snoop traffic both locally and across cores on a chip multi-core fabric according to embodiments of the invention. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1A.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
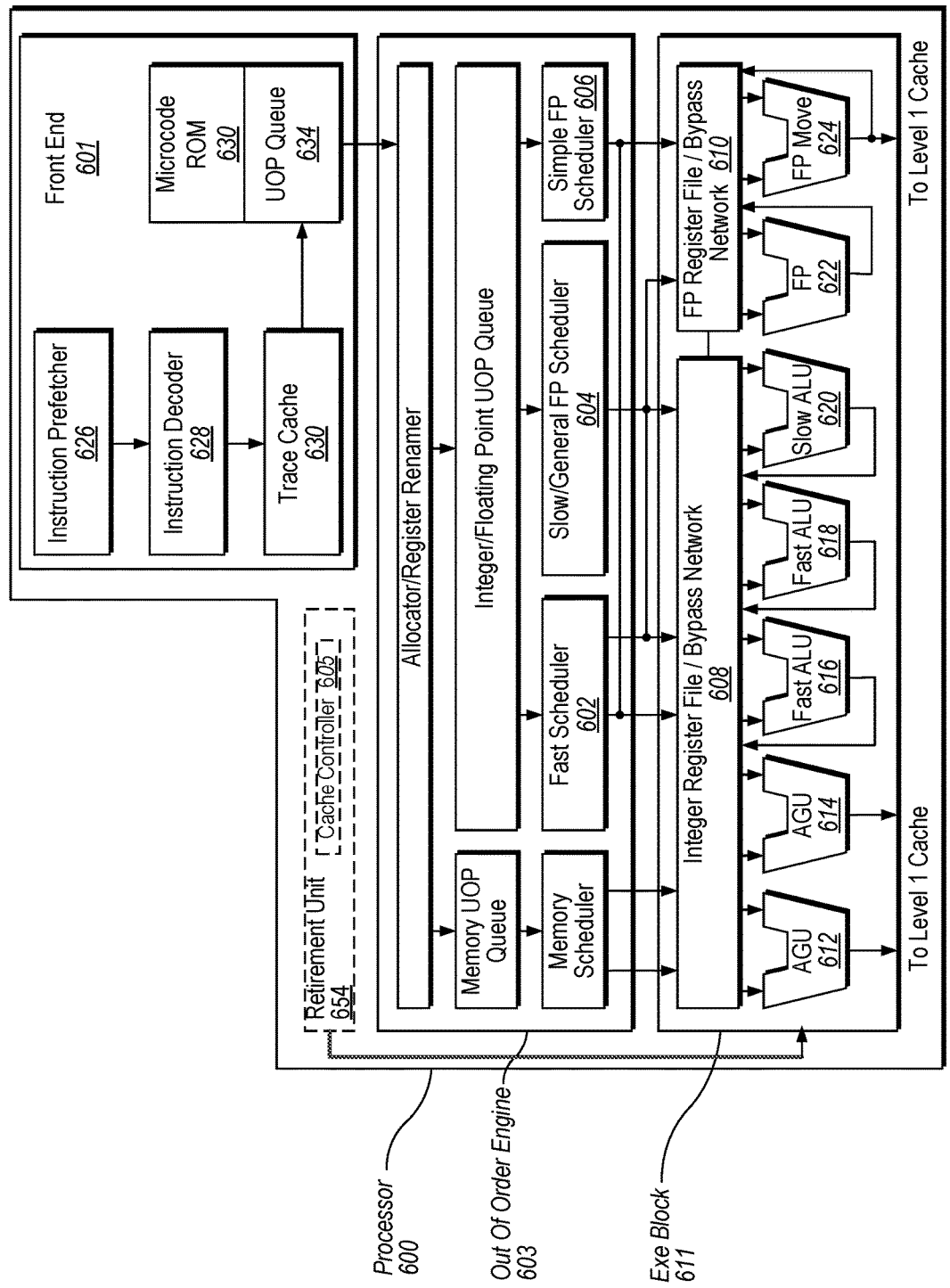
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The processor 600 may include a retirement unit 654 coupled to the execution block 611. The retirement unit 654 may include a cache controller 605 to minimize snoop traffic both locally and across cores on a chip multi-core fabric according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
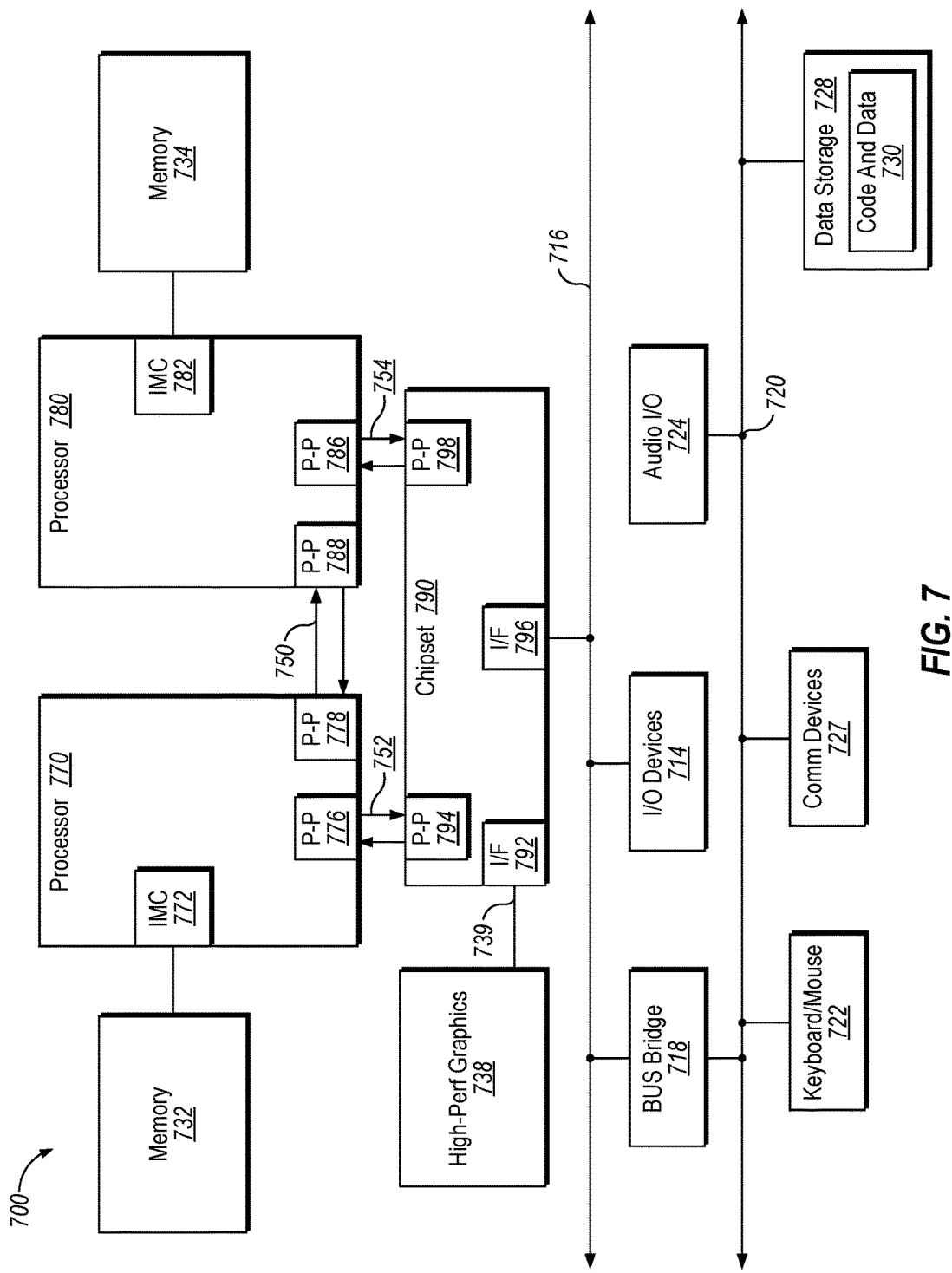
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
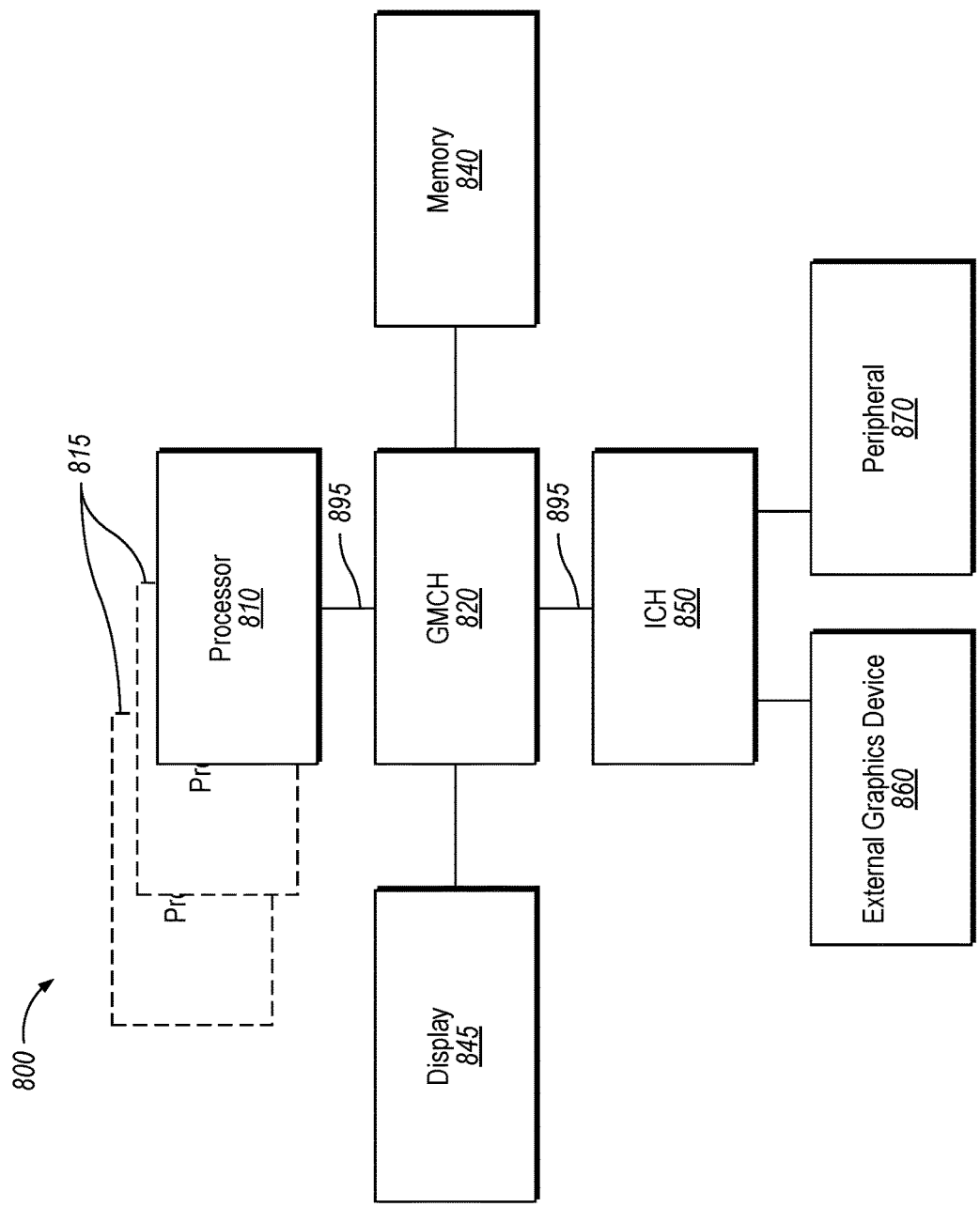
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
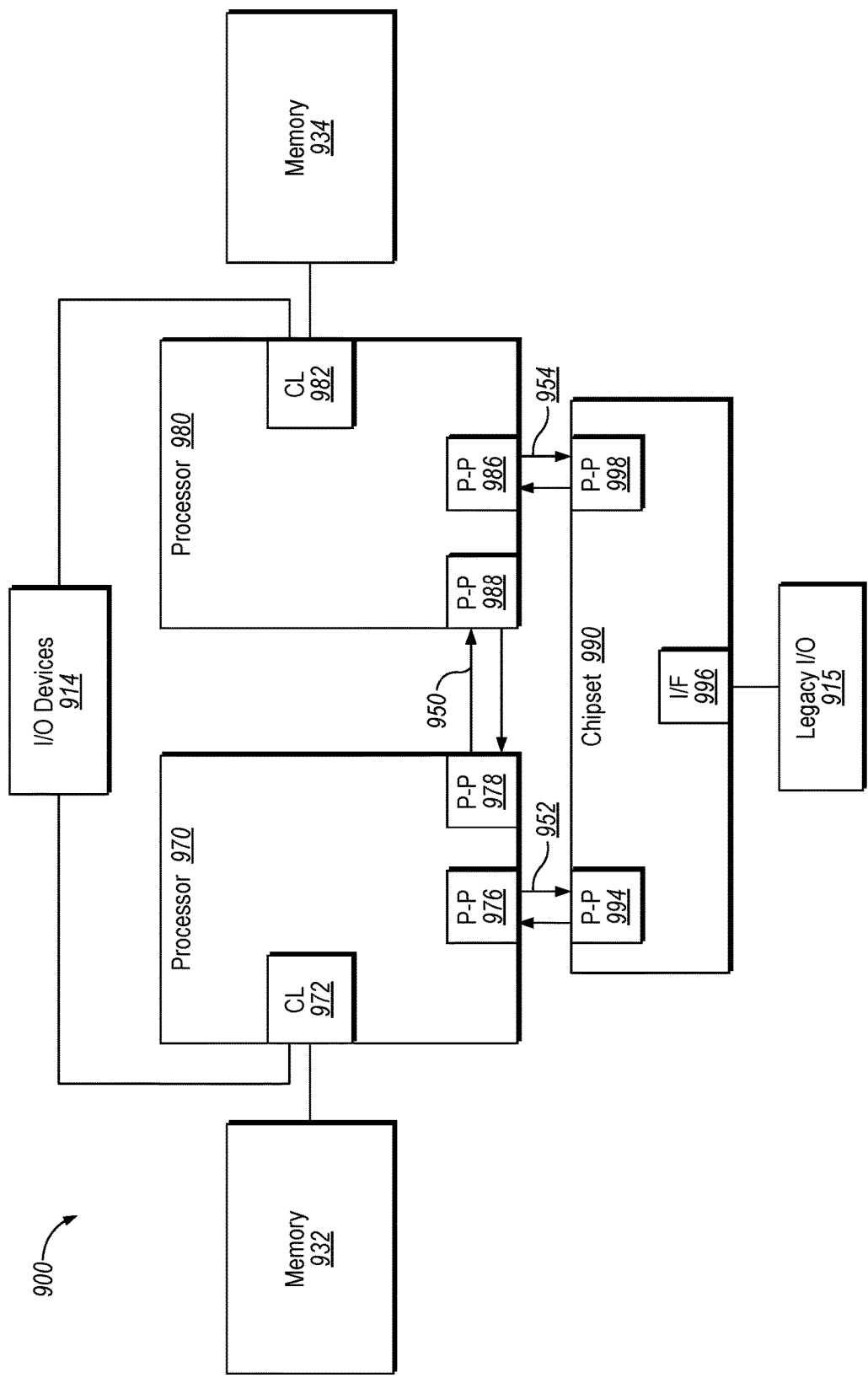
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
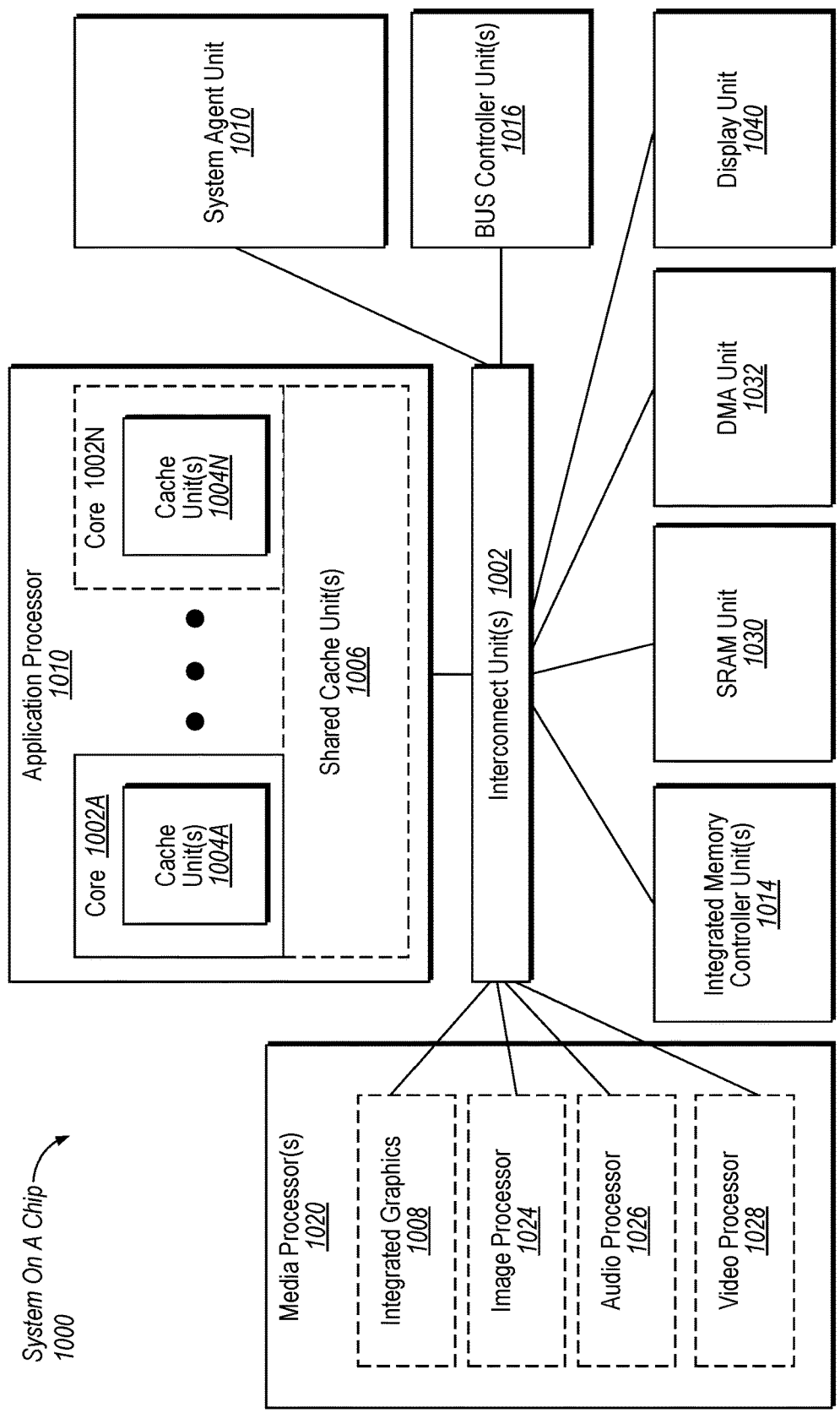
FIG. 10 is a block diagram of an SoC in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
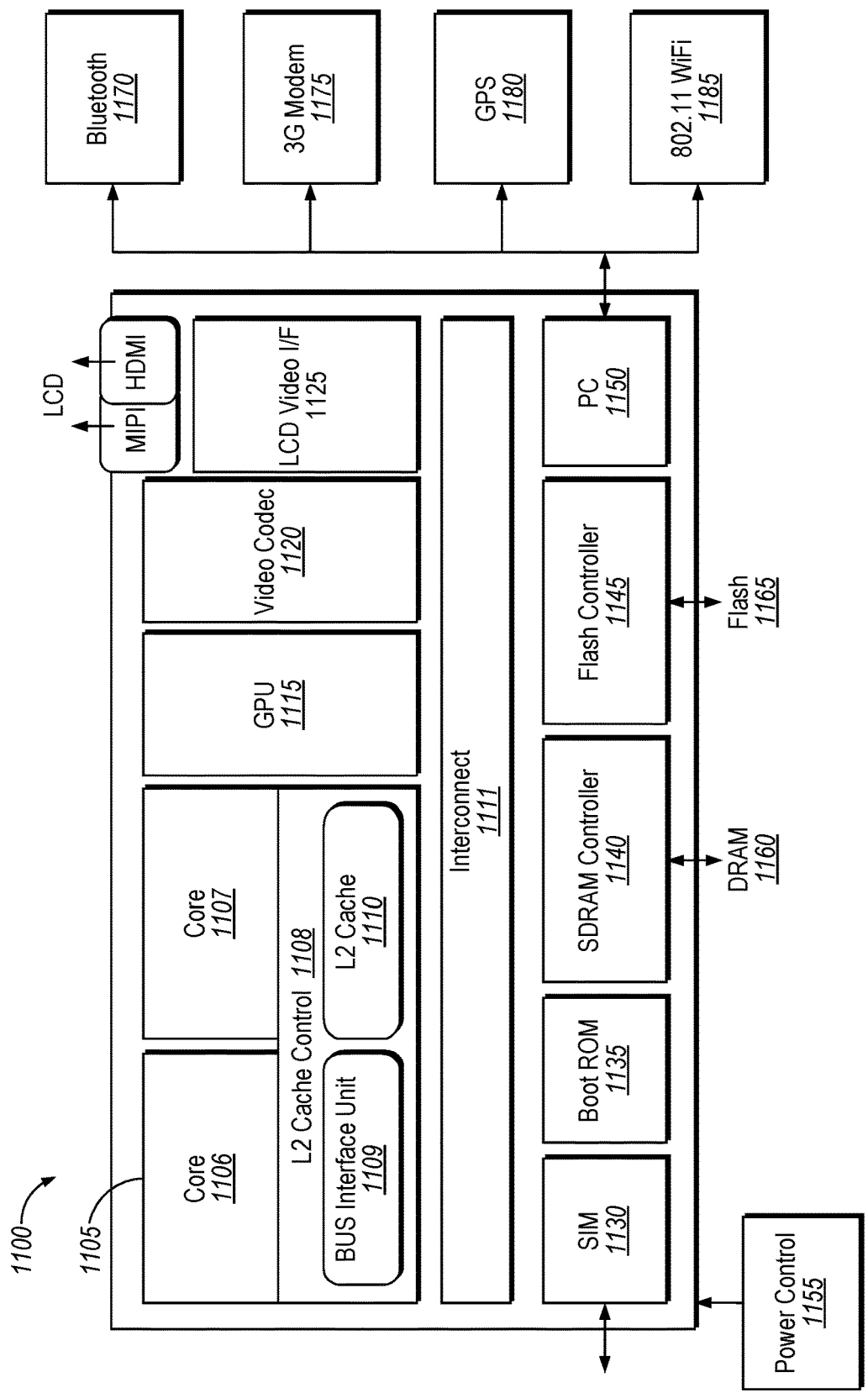
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
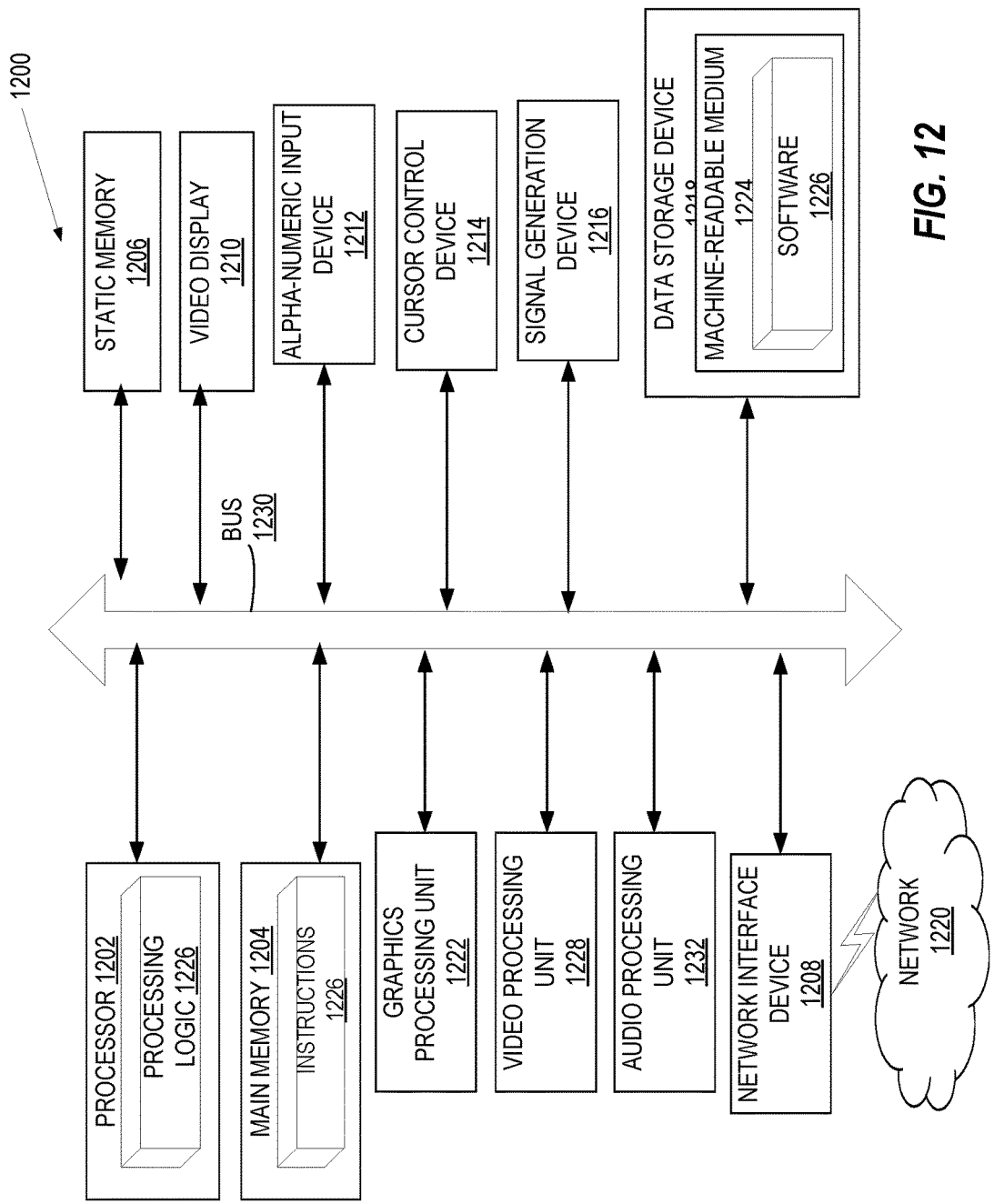
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1A as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processor comprising a first processing core; a first L1 cache comprising a first L1 cache data entry of a plurality of L1 cache data entries to store data; an L2 cache comprising a first L2 cache data entry of a plurality of L2 cache data entries, wherein the first L2 cache data entry corresponds to the first L1 cache data entry and each of the plurality of L2 cache data entries are associated with a corresponding presence bit (pbit) of a plurality of pbits, wherein each of the plurality of pbits indicates a status of a corresponding one of the plurality of L2 cache data entries; and a cache controller to, in response to a first request among a plurality of requests to access the data at the first L1 cache data entry, determine that a copy of the data is stored in the first L2 cache data entry; and retrieve the copy of the data from the L2 cache data entry in view of the status of the pbit.

In Example 2, the subject matter of Example 1 can optionally include wherein the status indicated by the plurality of pbits of each of the plurality of L2 cache data entries comprise that data in each of the corresponding plurality of the L1 cache data entries is one of present, absent, valid or invalid.

In Example 3, the subject matter of Examples 1-2 can optionally include a second processing core; and a second L1 cache comprising a second L1 cache data entry of the plurality of L1 data cache entries, wherein the second processing core to send the first request to access the data at the first L1 cache data entry in the first processing core.

In Example 4, the subject matter of Examples 1-3 can optionally include wherein the cache controller to send a global observatory signal to the second L1 cache when it is determined that the status indicated by the pbit for the first L1 cache data entry is one of absent and invalid, wherein the global observatory signal comprises instructions to use the data in the first L2 data cache entry; and send the data in the first L2 data cache entry to the second L1 cache.

In Example 5, the subject matter of Examples 1-4 can optionally include wherein cache controller sends the data in the first L2 data cache entry to the second L1 cache along with instructions to the second L1 cache to not use the data in the first L2 data cache entry when it is determined that the status indicated by the pbit for the first L1 cache data entry is one of present and valid, wherein the invalid status comprises that the data in the first L1 cache data entry is currently being used by the first processing core.

In Example 6, the subject matter of Examples 1-5 can optionally include wherein the cache controller sends a global observatory signal to the second L1 cache when it is determined that the data in the first L1 cache data entry currently being used is not modified, wherein the global observatory signal comprises an instruction to use the data in the first L2 data cache entry.

In Example 7, the subject matter of Examples 1-6 can optionally include wherein the first L1 cache comprise a first L1 cache instruction entry of a plurality of L1 cache instruction entries to store an instruction, the L2 cache comprising a first L2 cache instruction entry of the plurality of L2 cache instruction entries, wherein the L2 cache is assigned a cache entry state that indicates status of each of the plurality of L2 cache instruction entries.

In Example 8, the subject matter of Examples 1-7 can optionally include wherein when an access of the instruction at the first L1 cache instruction entry occurs, the cache controller is to retrieve the instruction directly from a L2 cache entry among the plurality of L2 cache entries when the L2 cache is at least one of an exclusive state or a modified state.

In Example 9, the subject matter of Examples 1-8 can optionally include wherein when an access of the instruction at the first L1 cache instruction entry occurs, the cache controller sends a message to remove the instruction from the first L1 cache instruction entry and retrieves the instruction directly from a L2 cache entry among the plurality of L2 cache entries when the L2 cache is at least in one of a shared state or a forward state.

In Example 10, the subject matter of Examples 1-9 can optionally include wherein upon determining that the copy of the data is not stored in the first L2 cache data entry, the cache controller is to send the first request to a requestor queue, wherein the requestor queue stores an entry identification (ID) of the first request and sends the first request to a scheduler queue to retrieve the data from a main memory, wherein the entry ID corresponds to a memory address of the main memory.

In Example 11, the subject matter of Examples 1-10 can optionally include wherein when a second request to access the data at the L1 cache data entry is received, the cache controller is to determine whether a copy of the data is stored in the first L2 cache data entry, wherein upon determining that the copy of the data is not stored in the first L2 cache data entry, the cache controller is to send the second request to the requestor queue.

In Example 12, the subject matter of Examples 1-11 can optionally include wherein the requestor queue is to determine a conflict when the entry ID of the second request matches the entry ID of the first request and upon determination of the conflict, the requestor queue is to place the second request in a sleep mode.

In Example 13, the subject matter of Examples 1-12 can optionally include wherein the requestor queue is to change the second request from the sleep mode to a wake mode upon receipt of a de-allocated entry ID of the first request from the scheduler queue, wherein the de-allocated entry ID corresponds to de-allocation of the memory address of the main memory; and send the second request to the scheduler queue to retrieve the data from the main memory.

Example 14 is a system-on-a-chip (SoC) comprising a processor comprising a first processing core; a first L1 cache comprising a first L1 cache data entry of a plurality of L1 cache data entries to store data; an L2 cache comprising a first L2 cache data entry of a plurality of L2 cache data entries, wherein the first L2 cache data entry corresponds to the first L1 cache data entry and each of the plurality of L2 cache data entries are associated with a corresponding presence bit (pbit) of a plurality of pbits, wherein each of the plurality of pbits indicates a status of a corresponding one of the plurality of L2 cache data entries; and a cache controller to, in response to a first request among a plurality of requests to access the data at the first L1 cache data entry, determine that a copy of the data is stored in the first L2 cache data entry; and retrieve the copy of the data from the L2 cache data entry in view of the status of the pbit.

In Example 15, the subject matter of Example 14 can optionally include wherein upon determining that the copy of the data is not stored in the first L2 cache data entry, the cache controller is to send the first request to a requestor queue, wherein the requestor queue stores an entry identification (ID) of the first request and sends the first request to a scheduler queue to retrieve the data from a main memory, wherein the entry ID corresponds to a memory address of the main memory.

Example 16 is a method comprising receiving, by a processor, a first request among a plurality of requests for an access of a data at a first L1 cache data entry of a plurality of L1 cache data entries in a first L1 cache of a first processing core; determining whether a copy of the data is stored in a first L2 cache data entry among a plurality of L2 cache data entries of the L2 cache, wherein the first L2 cache entry of the L2 cache corresponds to the first L1 cache data of the first L1 cache and wherein each of the plurality of L2 cache data entries of the L2 cache are associated with a presence bit (pbit), wherein the pbit indicates status of each of the plurality of L2 cache data entries; and upon determination that the copy of the data is stored in the first L2 cache data entry, retrieving the copy of the data from the L2 cache data entry in view of the pbit.

In Example 17, the subject matter of Example 16 can optionally include sending a global observatory signal to a second L1 cache when it is determined that status of the first L2 cache entry comprises that the data in the first L1 cache data entry is present and valid, wherein the global observatory signal comprises instructions to use the data in the first L2 data cache entry and sending the data in the first L2 data cache entry to the second L1 cache.

In Example 18, the subject matter of Examples 15-17 can optionally include sending the data in the first L2 data cache entry to a second L1 cache along with instructions to the second L1 cache to not use the data in the first L2 data cache entry when it is determined that the status of the first L2 cache entry comprises that the first L1 cache data entry is one of absent and invalid, wherein the invalid comprises that the data in the first L1 cache data entry is currently being used by the first processing core; and sending a global observatory signal to the second L1 cache when it is determined that the data in the first L1 cache data entry currently being used is not modified, wherein the global observatory signal comprises an instruction to use the data in the L2 data cache entry.

In Example 19, the subject matter of Examples 15-18 can optionally include wherein upon the determination that the copy of the data is not stored in the first L2 cache data entry, storing an entry identification (ID) of the first request and sending the first request to a scheduler queue to retrieve the data from a main memory, wherein the entry ID corresponds to a memory address of the main memory.

In Example 20, the subject matter of Examples 15-19 can optionally include receiving a second request among a plurality of requests for an access of the data at a first L1 cache data entry of a plurality of L1 cache data entries in a first L1 cache of a first processing core; determining whether a copy of the data is stored in the first L2 cache data entry; upon determination that the copy of the data is not stored in the first L2 cache data entry, determining a conflict when the entry ID of the second request is same as the entry ID of the first request; placing the second request in a sleep mode; changing the second request from the sleep mode to a wake mode upon receipt of a de-allocated entry ID of the first request from the scheduler queue, wherein the de-allocated entry ID corresponds to de-allocation of the memory address of the main memory; and sending the second request to the scheduler queue to retrieve the data from the main memory.

Example 21 is a non-transitory machine-readable storage medium including instructions that, when accessed by a processing device, cause the processing device to perform operations comprising receiving, by a processor, a first request among a plurality of requests for an access of a data at a first L1 cache data entry of a plurality of L1 cache data entries in a first L1 cache of a first processing core; determining whether a copy of the data is stored in a first L2 cache data entry among a plurality of L2 cache data entries of the L2 cache, wherein the first L2 cache entry of the L2 cache corresponds to the first L1 cache data of the first L1 cache and wherein each of the plurality of L2 cache data entries of the L2 cache are associated with a presence bit (pbit), wherein the pbit indicates status of each of the plurality of L2 cache data entries; and upon determination that the copy of the data is stored in the first L2 cache data entry, retrieving the copy of the data from the L2 cache data entry in view of the pbit.

In Example 22, the subject matter of Example 21 can optionally include wherein the operations further comprising sending a global observatory signal to a second L1 cache when it is determined that status of the first L2 cache entry comprises that the data in the first L1 cache data entry is present and valid, wherein the global observatory signal comprises instructions to use the data in the first L2 data cache entry and sending the data in the first L2 data cache entry to the second L1 cache.

In Example 23, the subject matter of Examples 21-22 can optionally include wherein the operations further comprising sending the data in the first L2 data cache entry to a second L1 cache along with instructions to the second L1 cache to not use the data in the first L2 data cache entry when it is determined that the status of the first L2 cache entry comprises that the first L1 cache data entry is one of absent and invalid, wherein the invalid comprises that the data in the first L1 cache data entry is currently being used by the first processing core; and sending a global observatory signal to the second L1 cache when it is determined that the data in the first L1 cache data entry currently being used is not modified, wherein the global observatory signal comprises an instruction to use the data in the L2 data cache entry.

In Example 24, the subject matter of Examples 21-23 can optionally include wherein the operations further comprising wherein upon the determination that the copy of the data is not stored in the first L2 cache data entry, storing an entry identification (ID) of the first request and sending the first request to a scheduler queue to retrieve the data from a main memory, wherein the entry ID corresponds to a memory address of the main memory.

In Example 25, the subject matter of Examples 21-24 can optionally include wherein the operations further comprising receiving a second request among a plurality of requests for an access of the data at a first L1 cache data entry of a plurality of L1 cache data entries in a first L1 cache of a first processing core; determining whether a copy of the data is stored in the first L2 cache data entry; upon determination that the copy of the data is not stored in the first L2 cache data entry, determining a conflict when the entry ID of the second request is same as the entry ID of the first request; placing the second request in a sleep mode; changing the second request from the sleep mode to a wake mode upon receipt of a de-allocated entry ID of the first request from the scheduler queue, wherein the de-allocated entry ID corresponds to de-allocation of the memory address of the main memory; and sending the second request to the scheduler queue to retrieve the data from the main memory.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a first processing core;
   a first L1 cache comprising a first L1 cache data entry of a plurality of L1 cache data entries to store data;
   an L2 cache comprising a first L2 cache data entry of a plurality of L2 cache data entries, wherein the first L2 cache data entry corresponds to the first L1 cache data entry and each of the plurality of L2 cache data entries are associated with a corresponding presence bit (pbit) of a plurality of pbits, wherein each of the plurality of pbits indicates a status of a corresponding one of the plurality of L1 cache data entries; and
   a cache controller to, in response to a first request among a plurality of requests to access the data at the first L1 cache data entry:
      determine that a copy of the data of the first L1 cache data entry is stored in the first L2 cache data entry;
      determine the status of the pbit of the first L2 cache data entry;
      in response to the determined status of the pbit indicating a present status and a valid status, retrieve the copy of the data from the L1 cache data entry;
      in response to the determined status of the pbit indicating at least one of an absent status or an invalid status, send a global observatory signal to a second L1 cache of a second processor core; and
      in response to the determined status of the pbit indicating the present status and the invalid status, send the data in the first L2 cache data entry to the second L1 cache along with instructions to the second L1 cache to not use the data in the first L2 cache data entry.

2. The processor of claim 1, wherein the status indicated by the plurality of pbits of each of the plurality of L2 cache data entries comprise that data in each of the corresponding plurality of the L1 cache data entries is one of present, absent, valid or invalid.

3. The processor of claim 2 further comprising:
   the second processing core; and
   the second L1 cache comprising a second L1 cache data entry of the plurality of L1 cache data entries, wherein the second processing core to send the first request to access the data at the first L1 cache data entry in the first processing core.

4. The processor of claim 1 wherein the cache controller to:
   inject a snoop into the first processor core responsive to the determined status of the pbit indicating the present status and the valid status; and
   refrain from injecting the snoop into the first processor core responsive to the determined status of the pbit indicating at least one of the absent status or the invalid status.

5. The processor of claim 1, wherein the global observatory signal comprises instructions to use the data in the first L2 cache data entry, and wherein the invalid status indicates that the data in the first L1 cache data entry is currently being used by the first processing core.

6. The processor of claim 5 wherein the cache controller sends the global observatory signal to the second L1 cache responsive to determining that the data in the first L1 cache data entry currently being used is not modified, wherein the global observatory signal comprises an instruction to use the data in the first L2 cache data entry.

7. The processor of claim 1 wherein the first L1 cache comprise a first L1 cache instruction entry of a plurality of L1 cache instruction entries to store an instruction, the L2 cache comprising a first L2 cache instruction entry of a plurality of L2 cache instruction entries, wherein the L2 cache is assigned a cache entry state that indicates status of each of the plurality of L2 cache instruction entries.

8. The processor of claim 7 wherein responsive to occurrence of an access of the instruction at the first L1 cache instruction entry, the cache controller is to retrieve the instruction directly from a L2 cache instruction entry among the plurality of L2 cache instruction entries when the L2 cache is at least one of an exclusive state or a modified state.

9. The processor of claim 7 wherein responsive to occurrence of an access of the instruction at the first L1 cache instruction entry, the cache controller sends a message to remove the instruction from the first L1 cache instruction entry and retrieves the instruction directly from a L2 cache instruction entry among the plurality of L2 cache instruction entries when the L2 cache is at least in one of a shared state or a forward state.

10. The processor of claim 1 wherein in response to determining that the copy of the data is not stored in the first L2 cache data entry, the cache controller is to send the first request to a requestor queue, wherein the requestor queue stores an entry identification (ID) of the first request and sends the first request to a scheduler queue to retrieve the data from a main memory, wherein the entry ID corresponds to a memory address of the main memory.

11. The processor of claim 10, wherein responsive to receiving a second request to access the data at the L1 cache data entry, the cache controller is to determine whether a copy of the data is stored in the first L2 cache data entry, and wherein in response to determining that the copy of the data is not stored in the first L2 cache data entry, the cache controller is to send the second request to the requestor queue.

12. The processor of claim 11 wherein the requestor queue is to determine a conflict when the entry ID of the second request matches the entry ID of the first request and upon determination of the conflict, the requestor queue is to place the second request in a sleep mode.

13. The processor of claim 12 wherein the requestor queue is to:
change the second request from the sleep mode to a wake mode upon receipt of a de-allocated entry ID of the first request from the scheduler queue, wherein the de-allocated entry ID corresponds to de-allocation of the memory address of the main memory; and
send the second request to the scheduler queue to retrieve the data from the main memory.

14. A system-on-a-chip (SoC) comprising:
a processor comprising:
a first processing core;
a first L1 cache comprising a first L1 cache data entry of a plurality of L1 cache data entries to store data;
an L2 cache comprising a first L2 cache data entry of a plurality of L2 cache data entries, wherein the first L2 cache data entry corresponds to the first L1 cache data entry and each of the plurality of L2 cache data entries are associated with a corresponding presence bit (pbit) of a plurality of pbits, wherein each of the plurality of pbits indicates a status of a corresponding one of the plurality of L1 cache data entries; and
a cache controller to, in response to a first request among a plurality of requests to access the data at the first L1 cache data entry:
determine that a copy of the data of the first L1 cache data entry is stored in the first L2 cache data entry;
determine the status of the pbit of the first L2 cache data entry;
in response to the determined status of the pbit indicating a present status and a valid status, retrieve the copy of the data from the L1 cache data entry;
in response to the determined status of the pbit indicating at least one of an absent status or an invalid status, send a global observatory signal to a second L1 cache of a second processor core; and
in response to the determined status of the pbit indicating the present status and the invalid status, send the data in the first L2 cache data entry to the second L1 cache along with instructions to the second L1 cache to not use the data in the first L2 cache data entry.

15. The SoC of claim 14 wherein in response to determining that the copy of the data is not stored in the first L2 cache data entry, the cache controller is to send the first request to a requestor queue, wherein the requestor queue stores an entry identification (ID) of the first request and sends the first request to a scheduler queue to retrieve the data from a main memory, and wherein the entry ID corresponds to a memory address of the main memory.

16. A method comprising:
receiving, by a processor, a first request among a plurality of requests for an access of a data at a first L1 cache data entry of a plurality of L1 cache data entries in a first L1 cache of a first processing core;
determining whether a copy of the data is stored in a first L2 cache data entry among a plurality of L2 cache data entries of the L2 cache, wherein the first L2 cache data entry of the L2 cache corresponds to the first L1 cache data entry of the first L1 cache and wherein each of the plurality of L2 cache data entries of the L2 cache are associated with a presence bit (pbit), wherein the pbit indicates status of each of the plurality of L1 cache data entries;
determining that a copy of the data of the first L1 cache data entry is stored in the first L2 cache data entry;
determining the status of the pbit of the first L2 cache data entry;
in response to the determined status of the pbit indicating a present status and a valid status, retrieving the copy of the data from the L1 cache data entry;
in response to the determined status of the pbit indicating at least one of an absent status or an invalid status, sending a global observatory signal to a second L1 cache of a second processor core; and
in response to the determined status of the pbit indicating the present status and the invalid status, sending the data in the first L2 cache data entry to the second L1 cache along with instructions to the second L1 cache to not use the data in the first L2 cache data entry.

17. The method of claim 16 further comprising:
injecting a snoop into the first processor core responsive to the determined status of the pbit indicating the present status and the valid status; and
refraining from injecting the snoop into the first processor core responsive to the determined status of the pbit indicating at least one of the absent status or the invalid status.

18. The method of claim 16
wherein the global observatory signal comprises instructions to use the data in the first L2 cache data entry, and wherein the invalid comprises that the data in the first L1 cache data entry is currently being used by the first processing core; and
wherein the method further comprises sending a second global observatory signal to the second L1 cache responsive to determining that the data in the first L1 cache data entry currently being used is not modified, wherein the second global observatory signal comprises an instruction to use the data in the L2 cache data entry.

19. The method of claim 16 further comprising responsive to the determination that the copy of the data is not stored in the first L2 cache data entry, storing an entry identification (ID) of the first request and sending the first request to a scheduler queue to retrieve the data from a main memory, wherein the entry ID corresponds to a memory address of the main memory.

20. The method of claim 19 further comprising:
receiving a second request among a plurality of requests for an access of the data at a first L1 cache data entry of a plurality of L1 cache data entries in a first L1 cache of a first processing core;
determining whether a copy of the data is stored in the first L2 cache data entry;
responsive to determining that the copy of the data is not stored in the first L2 cache data entry, determining a conflict when the entry ID of the second request is same as the entry ID of the first request;
placing the second request in a sleep mode;

changing the second request from the sleep mode to a wake mode upon receipt of a de-allocated entry ID of the first request from the scheduler queue, wherein the de-allocated entry ID corresponds to de-allocation of the memory address of the main memory; and sending the second request to the scheduler queue to retrieve the data from the main memory.

21. A non-transitory machine-readable storage medium including instructions that, when accessed by a processing device, cause the processing device to perform operations comprising:

receiving, by a processor, a first request among a plurality of requests for an access of a data at a first L1 cache data entry of a plurality of L1 cache data entries in a first L1 cache of a first processing core;

determining whether a copy of the data is stored in a first L2 cache data entry among a plurality of L2 cache data entries of the L2 cache, wherein the first L2 cache data entry of the L2 cache corresponds to the first L1 cache data entry of the first L1 cache and wherein each of the plurality of L2 cache data entries of the L2 cache are associated with a presence bit (pbit), wherein the pbit indicates status of each of the plurality of L1 cache data entries;

determining that a copy of the data of the first L1 cache data entry is stored in the first L2 cache data entry;

determining the status of the pbit of the first L2 cache data entry;

in response to the determined status of the pbit indicating a present status and a valid status, retrieving the copy of the data from the L1 cache data entry;

in response to the determined status of the pbit indicating at least one of an absent status or an invalid status, sending a global observatory signal to a second L1 cache of a second processor core; and in response to the determined status of the pbit indicating the present status and the invalid status, sending the data in the first L2 cache data entry to the second L1 cache along with instructions to the second L1 cache to not use the data in the first L2 cache data entry.

22. The non-transitory machine-readable storage medium of claim 21, wherein the operations further comprising:

injecting a snoop into the first processor core responsive to the determined status of the pbit indicating the present status and the valid status; and refraining from injecting the snoop into the first processor core responsive to the determined status of the pbit indicating at least one of the absent status or the invalid status.

23. The non-transitory machine-readable storage medium of claim 21, wherein the global observatory signal comprises instructions to use the data in the first L2 cache data entry, and wherein the invalid comprises that the data in the first L1 cache data entry is currently being used by the first processing core; and wherein the operations further comprise sending a second global observatory signal to the second L1 cache responsive to determining that the data in the first L1 cache data entry currently being used is not modified, wherein the second global observatory signal comprises an instruction to use the data in the L2 cache data entry.

24. The non-transitory machine-readable storage medium of claim 21 wherein the operations further comprising responsive to determining that the copy of the data is not stored in the first L2 cache data entry, storing an entry identification (ID) of the first request and sending the first request to a scheduler queue to retrieve the data from a main memory, wherein the entry ID corresponds to a memory address of the main memory.

25. The non-transitory machine-readable storage medium of claim 24 wherein the operations further comprising:

receiving a second request among a plurality of requests for an access of the data at a first L1 cache data entry of a plurality of L1 cache data entries in a first L1 cache of a first processing core;

determining whether a copy of the data is stored in the first L2 cache data entry;

responsive to determining that the copy of the data is not stored in the first L2 cache data entry, determining a conflict when the entry ID of the second request is same as the entry ID of the first request;

placing the second request in a sleep mode;

changing the second request from the sleep mode to a wake mode upon receipt of a de-allocated entry ID of the first request from the scheduler queue, wherein the de-allocated entry ID corresponds to de-allocation of the memory address of the main memory; and sending the second request to the scheduler queue to retrieve the data from the main memory.

\* \* \* \* \*